United States Patent [19]
Umezawa et al.

[11] 3,929,762
[45] Dec. 30, 1975

[54] 3'-DEOXY DERIVATIVES OF NEAMINE AND ITS RELATED AMINOGLYCOSIDIC ANTIBIOTICS, AND THE PRODUCTION THEREOF

[75] Inventors: Hamao Umezawa; Sumio Umezawa, both of Tokyo; Osamu Tsuchiya, Yokohama, all of Japan

[73] Assignee: Zaidan Hojin Biseibutsu Kagaku Kenkyu Kai, Tokyo, Japan

[22] Filed: Dec. 5, 1973

[21] Appl. No.: 421,821

Related U.S. Application Data
[63] Continuation-in-part of Ser. No. 390,403, Aug. 22, 1973.

[30] Foreign Application Priority Data
Aug. 23, 1972 Japan.............................. 47-83671
Dec. 8, 1972 Japan............................ 47-122436

[52] U.S. Cl............................ 260/210 AB; 424/180
[51] Int. Cl.²........................................... C07G 3/00
[58] Field of Search................... 260/210 AB, 210 K

[56] References Cited
UNITED STATES PATENTS
3,753,973   8/1973   Umezawa et al............ 260/210 AB

OTHER PUBLICATIONS

Wagner and Zook, *Synthetic Organic Chemistry*, Wiley and Sons, Inc., New York, 1953, pp. 8 & 95–96.

Umezawa, "Synthesis of 6'-N-Methyl Kanamycin . . . Enzymes," Journal of Antibiotics, Vol. 25, No. 12, 1972, pp. 743–745.

*Primary Examiner*—Johnnie R. Brown
*Assistant Examiner*—Cary Owens
*Attorney, Agent, or Firm*—James C. Haight

[57] ABSTRACT

The 3'-hydroxyl group of neamine and related aminoglycosidic antibiotics is preferentially sulfonylated with an alkylsulfonyl halide, arylsulfonyl halide or benzylsulfonyl halide and the resultant 3'-sulfonic ester group halogenated with a concentrated solution of alkali metal bromide or iodide in an aprotic solvent to yield halogenated intermediates which can be hydrogenated to form corresponding 3'-deoxy derivatives which exhibit useful antibacterial activity even against bacteria resistant to the parent aminoglycosidic antibiotics.

17 Claims, No Drawings

3'-DEOXY DERIVATIVES OF NEAMINE AND ITS RELATED AMINOGLYCOSIDIC ANTIBIOTICS, AND THE PRODUCTION THEREOF

This application is a continuation-in-part of copending, commonly assigned U.S. patent application Ser. No. 390,403 filed Aug. 22, 1973.

This invention relates to 3'-deoxy derivatives of neamine and its related aminoglycosidic antibiotics, and more particularly to 3'-deoxyneamine, 6'-N-alkyl-3'-deoxyneamines, 3'-deoxyvistamycin, 6'-N-alkyl-3'-deoxyvistamycins, 3'-deoxykanamycin B and 6'-N-alkyl-3'-deoxykanamycins B which are all new substances excepting 3'-deoxyneamine and which are all useful in the therapeutic treatment of infections by grampositive and gram-negative bacteria, including drugresistant bacteria. This invention further relates to a process for the production of said 3'-deoxy derivatives of neamine and its related aminoglycosidic antibiotics.

Kanamycins and neamine are well known aminoglycosidic antibiotics, and vistamysin is also a known aminoglycosidic antibiotic, designated also as ribostamycin or Antibiotic SF-733; see *The Journal of Antibiotics* Vol. 23, No. 3, pages 155–161 and No. 4, pages 173–183 (1970). This vistamycin has been identified as 5-0-β-D-ribofuranosyl-neamine. These aminoglycosidic antibiotics have been used widely as valuable, chemotherapeutic agents, but drug-resistant strains which are resistant to these known aminoglycosidic antibiotics have occurred in recent years. Accordingly, the mechanism of resistance of these drug-resistant bacteria to the known aminoglycosidic antibiotics has been studied. For instance, one of the present inventors, H. Umezawa et al. have found that some strains of gram-negative bacteria carrying R factor, *Staphylococcus aureus* and *Pseudomonas aeruginosa* isolated from patients, are resistant to kanamycins and that these kanamycin-resistant strains have the mechanism of resistance that they produce an enzyme capable of phosphorylating the 3'-hydroxyl group of kanamycins and inactivate the kanamycins under the action of the phosphotransferase. See *Science* Vol. 157, page 1559 (1967).

On the basis of this finding, H. Umezawa et al. have prepared semi-synthetically 3'-deoxykanamycin wherein the 3'-hydroxyl group of the kanamycin molecule has been removed therefrom, as well as 3', 4'-dideoxykanamycin B, 3', 4'-dideoxyneamine and 3', 4'-dideoxyvistamycin as described in the *Journal of Antibiotics* Ser. A, Vol. 24, pages 274–275 (1971); Vol. 24, pages 485–487; Vol. 24, pages 711–712 (1971) and Vol. 25, pages 613–617 (1972). 3'-Deoxykanamycin; 3', 4'-dideoxykanamycin B; and 3', 4'-dideoxyneamine are actually effective against the above-mentioned kanamycin-resistant strains, but 3', 4'-dideoxyvistamycin can be inactivated by phosphorylating 5''-hydroxyl group of this antibiotic under the action of the phosphotransferase. Furthermore, these deoxy derivatives have found to be inactive against other kanamcin-resistant strains such as *Escherichia coli* K-12, R-5 and *Pseudomonas aeruginosa* GN-315 etc., which have been isolated from patients and which produce an enzyme capable of 6'-N-acetylating the above-mentioned deoxy derivatives. Accordingly, we have synthetized 6'-N-alkylated derivatives of said deoxy derivatives and have found that such 6'-N-alkylated derivatives are active even against *E. coli* K-12, R-5 and *P. aeruginosa* GN-315 (see the *Journal of Antibiotics* Vol. 25, No. 12, pages 743–745 (December, 1972) and co-pending U.S. patent application Ser. No. 390,403; British patent application Ser. No. 39449/73). 3'-Deoxykanamycin B is the same compound as that is known as nebramycin factor 6 (see the *Antimicrobial Agent and Chemotherapy* pages 309–313 (1970)) and which is also called tobramycin.

An object of this invention is to provide further new and useful deoxy derivatives of neamine and its related aminoglycosidic antibiotics which are effective against the drug-resistant bacterial. A more particular object of this invention is to provide 3'-deoxy derivatives of 6'-N-alkylneamines, vistamycin, 6'-N-alkylvistamycins and 6'-N-alkylkanamycins B as new substances which are useful as chemotherapeutic agents to treat bacterial infections. Another object of this invention is to provide a process for the production of 3'-deoxy derivatives of neamine and its related aminoglycosidic antibiotics, including the known substances 3'-deoxyneamine and 3'-deoxykanamycin B, which may be carried out in a facile way starting from the parent antibiotics. Other objects of this invention will be clear from the following descriptions.

Neamine and its related aminoglycosidic antibiotics are polyamino-polyol compounds of which the chemical structure is somewhat complicated, so that it is very difficult in chemical synthesis to selectively remove only the 3'-hydroxyl group from such a polyaminopolyol compound which contains many functional hydroxyl groups and many functional amino groups in the molecule thereof. Thus, 3'-deoxykanamycin was synthetized by condensation of two parts of suitably protected aminosugar derivatives as described in the *Journal of Antibiotics* Vol. 21, pages 274–275 (1971). As a result of our extensive research, we have now found that the 3'-hydroxyl group of neamine and its related aminoglycosidic antibiotic will react with an alkylsulfonyl halide, an arylsulfonyl halide or benzylsulfonyl halide as the sulfonylating agent at a higher rate than the 4'-hydroxyl group of said aminoglycosidic antibiotic when the sulfonylating reaction is carried out with all the other functional hydroxyl groups and amino groups of the antibiotic having been protected by a known hydroxyl-protecting group and by a known amino-protecting group, respectively. It has also been found that once the 3'-hydroxyl group has preferentially been sulfonylated by an arylsulfonyl halide or benzylsulfonyl halide which is bulky in its molecular dimensions, the subsequent sulfonylation of the 4'-hydroxyl group can relatively be hindered thereby, so that sulfonylation of the 4'-hydroxyl group would require a higher reaction temperature. On the basis of the above new findings, we have succeeded in synthetizing the 3'-deoxy derivatives of neamine and its related aminoglycosidic antibiotics by preferentially sulfonylating the 3'-hydroxyl group of said aminoglycosidic antibiotic and then converting the 3'-sulfonic ester group into hydrogen through halogenation followed by catalytic hydrogenation. The displacement of the 3'-sulfonic ester group with a halogen atom, however, is supposed not to be accomplished because of the presence of a β-transaxial substituent at C-1', that is, α-glycosidic substitution, as indicated, for example, by A. C. Richardson in Nucleophilic Replacement Reactions of Sulfonate, Part VI: A Summary of Steric and Polar Factors, *Carbohydrate Research*, 10, 395–402, (1969). In the present case, the substitution of the 3'-sulfonic ester with halogen atom did not take place in a usual condition. However, the inventors have found that the displacement occurs effectively if we use an alkali metal iodide or bromide in the form of a solution in an aprotic solvent in which the concentration of the alkali metal iodide or bromide is 50% or more of the saturation concentration (at 100°C), and prolonged reaction time (10–30 hours) and a reaction temperature (80°–150°C).

Furthermore, we have now found that the new 3'-deoxy derivatives of neamine and its related aminoglycosidic antibiotics so synthetized exhibit useful antibacterial activity against bacteria sensitive to the parent aminoglycosidic antibiotics, as well as against the bacteria resistant to the parent aminoglycosidic antibiotics, such as *E. coli* K-12, R-5.

According to a first aspect of this invention, therefore, there is provided as the new and useful substance 3'-deoxy derivatives of neamine related aminoglycosidic antibiotics, represented by the following general formula:

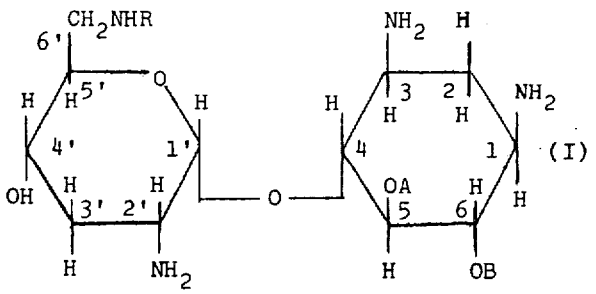

wherein R is a hydrogen atom or an alkyl group of 1–4 carbon atoms; A is a hydrogen atom or β-D-ribofuranosyl group of the formula:

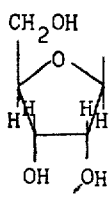

B is a hydrogen atom or 3-amino-3-deoxy-α-D-glucopyranosyl group of the formula:

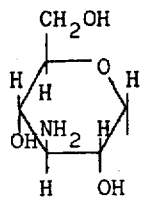

provided that A is not β-D-ribofuranosyl group when B is 3-amino-3-deoxy-α-D-glucopyranosyl group, and provided that R is an alkyl group of 1–4 carbon atoms when B is 3-amino-3-deoxy-α-D-glucopyranosyl group and when both A and B are hydrogen, and the pharmaceutically acceptable acid-addition salts thereof.

As examples of new compounds of the above general formula (I) according to the present invention are mentioned the following compounds:

1. 3'-Deoxy-6'-N-methylneamine (in the general formula (I); A=B=H, R=methyl).
2. 3'-Deoxyvistamycin (in the general formula (I); B=R=H, A=β-D-ribofuranosyl).
3. 3'-Deoxy-6'-N-methylvistamycin (in the general formula (I); B=H, R=methyl, A=β-D-ribofuranosyl).
4. 3'-Deoxy-6'-N-methylkanamycin B (in the general formula (I); A=H, B=3-amino-3-deoxy-α-D-glucopyranosyl, R=methyl).

Examples of the pharmaceutically acceptable acid-addition salt of the new substances of the general formula (I) according to this invention include the hydrochloride, sulfate, phosphate, acetate, maleate, fumarate, succinate, tartrate, oxalate, citrate, methanesulfonate, ethanesulfonate, and the like.

Physical and biological properties of the new substances of this invention are described below. 3'-Deoxyneamine is a colorless crystalline powder soluble in water. $[\alpha]_D + 98°$ (c 1, water). This compound is of a low toxicity to animals and men, as shown by the fact that it shows a $LD_{50}$ of more than 200 mg/kg upon intravenous injection of this compound in mice.

3'-Deoxy-6'-N-methylneamine is a colorless crystalline powder soluble in water. $[\alpha]_D^{20} + 87°$ (c 1, water). This compound is also less toxic to animal and men and shows a $LD_{50}$ of more than 200 mg/kg upon intravenous injection of this compound in mice.

3'-Deoxyvistamycin is a colorless crystalline powder soluble in water. $[\alpha]_D^{25} + 41°$ (c 1, water). This compound is also little toxic to animal and men and shows a $LD_{50}$ of 200 mg/kg upon intravenous injection of this compound in mice.

3'-Deoxy-6'-N-methylvistamycin is a colorless crystalline powder soluble in water. $[\alpha]_D^{20} + 35°$ (c 1, water). This compound is little toxic to animal and men and shows a $LD_{50}$ of 200 mg/kg upon intravenous injection in mice.

3'-Deoxy-6'-N-methyl-kanamycin B is a colorless crystalline powder soluble in water. $[\alpha]_D + 122°$ (c 1, water). This compound is little toxic to animal and men and shows a $LD_{50}$ of 150 mg/kg upon intravenous injection in mice.

3'-Deoxyneamine, 3'-deoxy-6'-N-methylneamine, 3'-deoxyvistamycin, 3'-deoxy-6'-N-methylvistamycin and 3'-deoxy-6'-N-methylkanamycin B exhibit not only an antibacterial activity as high as that of their respective parent substances (neamine, vistamycin and 6'-N-methylkanamycin B) against various gram-positive and gram-positive bacteria which are sensitive to these parent substances, but also they exhibit a high antibacterial activity against the kanamycin-resistant strains of *Staphylococcus aureus*, *Escherichaia coli* and *Pseudomonas aeruginosa* as well as against *Klebsiella pneumoniae* and *Salmonella typhosa*. In addition, they are of a toxicity as low as that of their parent substances, as shown by the fact that they exhibit a $LD_{50}$ value of more than 100 mg/kg upon intravenous injection of these compounds in mice.

The minimum inhibitory concentrations (mcg/ml) of the 3'-deoxyneamine, 3'-deoxyvistamycin, 3'-deoxykanamycin B and their 6'-N-methyl derivatives against various microorganisms were determined according to a standard serial dilution method using nutrient agar incubation medium at 37°C, the estimation being effected after 18 hours incubation, except for Mycobacterium smegmatis ATCC 607, in which the estimation being effected after 48 hours incubation. The minimum inhibitory concentrations (mcg/ml) of neamine, 3', 4'-dideoxyneamine, vistamycin, 3', 4'-dideoxyvistamycin, kanamycin B, 3', 4'-dideoxykanamycin B against microorganisms were also determined in the same manner. Antibacterial spectra of 3'-deoxyneamine, 3'-deoxyvistamycin, 3'-deoxykanamycin B and their 6'-N-methyl derivatives are shown in the following table, together with those of neamine, vistamycin, kanamycin B and their 3', 4'-dideoxyderivatives for comparison.

methylkanamycin B with those of kanamycin B and 3', 4'-dideoxykanamycin B. The 3'-deoxy compounds of the aminoglycosidic antibiotics according to the present invention, owing to the combination of their higher antibacterial activity and their lower toxicity to men, are much useful in the treatment of infections by some particular bacteria species or strains, even as compared to the known 3', 4'-dideoxy derivatives of the parent antibiotics.

The new compounds of the formula (I) according to this invention are of low toxicity to animals and men, as shown by a $LD_{50}$ value of more than 100 mg/kg upon intravenous injection of the compound in mice. In addition, the new compounds of this invention exhibit a high antibacterial activity against various gram-positive and gram-negative bacteria, including the kanamycin-resistant strains, so that the new compounds of this invention may be useful in treatment of infections by gram-positive and gram-negative bacteria. The compounds of this invention may be administered orally, intraperitioneally, intravenously or intramuscularly using any pharmaceutical form known to the art for

TABLE 1

| Test Organism | M.I.C. (mcg./ml) | | | | | | | |
|---|---|---|---|---|---|---|---|---|
| | 3'-deoxy-neamine | 3'-deoxy-6'-N-methyl-neamine | Neamine | 3',4'-dideoxy-neamine | 3'-deoxy-vistamycin | 3'-deoxy-6'-N-methyl-vistamycin | Vista-mycin | 3',4'-dideoxy-vista-mycin |
| Staphylococcus aureus FDA 209P | 3.12 | 6.25 | 6.25 | 6.25 | 3.12 | 3.12 | 3.12 | 3.12 |
| Klebsiella pneumonia PCI 602 | 6.25 | 6.25 | 12.5 | 0.39 | 1.56 | 3.12 | 3.12 | 3.12 |
| Salmonella typhosa T-63 | 3.12 | 6.25 | 3.17 | 25 | 0.78 | 1.56 | 1.56 | 1.56 |
| Escherichia coli NIHJ | 3.12 | 6.25 | 12.5 | 12.5 | 1.56 | 3.12 | 6.25 | 6.25 |
| Escherichia coli K-12 | 6.25 | 6.25 | 6.25 | 6.25 | 0.78 | 0.78 | 3.12 | 3.12 |
| Escherichia coli K-12 ML 1629* | 6.25 | 6.25 | >100 | 12.5 | 100 | 100 | >100 | >100 |
| Escherichia coli K-12 ML 1410 | 6.25 | 12.5 | 12.5 | 6.25 | 1.56 | 3.12 | 3.12 | 6.25 |
| Escherichia coli K-12 LA 290 R55* | 100 | 100 | >100 | 6.25 | 1.56 | 1.56 | >100 | 3.12 |
| Escherichia coli W 677 | 6.25 | 6.25 | 6.25 | 6.25 | 1.56 | 1.56 | 1.56 | 3.12 |
| Escherichia coli JR 66/ W 677* | >100 | 100 | >100 | 25 | 6.25 | 12.5 | >100 | 6.25 |
| Pseudomonas aeruginosa A3 | 6.25 | 6.25 | >100 | 25 | 3.12 | 3.12 | >100 | 6.25 |
| Pseudomonas aeruginosa No. 12 | 6.25 | 6.25 | >100 | 25 | 6.25 | 12.5 | >100 | 12.5 |
| Pseudomonas aeruginosa GN 315* | >100 | 12.5 | >100 | >100 | >100 | 12.5 | >100 | >100 |
| Mycobacterium smegmatis ATCC 607** | 3.12 | 3.12 | 100 | 25 | 0.78 | 1.56 | >100 | 3.12 |

| Test Organism | M.I.C. (mcg./ml.) | | | |
|---|---|---|---|---|
| | 3'-deoxy-kanamycin B | 3'-deoxy-6'-N-methyl-kanamycin B | kanamycin B | 3',4'-dideoxy-kanamycin B |
| Staphylococcus aureus FDA 209P | >0.2 | 0.39 | 3.12 | 1.56 |
| Klebsiella pneumonia PCI 602 | 0.39 | 0.39 | 0.39 | 0.39 |
| Salmonella typhosa T-63 | 0.2 | 0.39 | 0.39 | 0.39 |
| Escherichia coli NIHJ | 0.78 | 1.56 | 0.78 | 0.78 |
| Escherichia coli K-12 | 0.39 | 1.56 | 0.78 | 1.56 |
| Escherichia coli K-12 ML 1629* | 1.56 | 1.56 | >100 | 3.12 |
| Escherichia coli K-12 ML 1410 | 1.56 | 3.12 | 1.56 | 1.56 |
| Escherichia coli K-12 LA 290 R55* | 25 | 25 | 100 | >100 |
| Escherichia coli W 677 | 0.39 | 1.56 | 1.56 | 1.56 |
| Escherichia coli JR 66/ W 677* | 50 | 50 | >100 | 100 |
| Pseudomonas aeruginosa A3 | 1.56 | 3.12 | >100 | 3.12 |
| Pseudomonas aeruginosa No. 12 | 0.78 | 1.56 | 50 | 3.12 |
| Pseudomonas aeruginosa GN 315* | 100 | 6.25 | >100 | >100 |
| Mycobacterium smegmatis ATCC 607** | 0.2 | 0.78 | 0.35 | 0.35 |

In the above table, the mark * denotes the strain is a drug-resistant strain of patient-origin. The mark ** shows that the incubation was made for 48 hours.

From Table 1, it is seen that 3'-deoxyneamine and 3'-deoxy-6'-N-methylneamine have remarkably higher antibacterial activity against some particualr bacteria species or strains than neamine and 3', 4'-dideoxyneamine and that 3'-vistamycin and 3'-deoxy-6'-N-methylvistamycin also have remarkably higher antibacterial activity against some bacterial species or strain than vistamycin and 3', 4'-dideoxyvistamycin. This is similarly applied to the comparison of the antibacterial activity of 3'-deoxykanamycin B and 3'-deoxy-6'-N- such administration and in a similar manner to kanamycins. For instance, the compounds of the formula (I) of this invention may be administered orally using any pharmaceutical form known to the art for such oral administration. Examples of pharmaceutical forms for oral administration are powders, capsules, tablets, syrup, and the like. Suitable doses of the compound for the effective treatment of bacterial infections are in a range of 0.25-2 g. per person a day when it is given orally. It is preferred that said dose should be orally administered in three to four aliquots per day. The compounds of this invention may also be administered by intramuscular injection at a dosage of 50-200 mg.

per person once or twice a day. Moreover, the compounds of the invention may be formulated into an ointment for external application which contains the compound of this invention at a concentration of 0.5–5% by weight in mixture with a known ointment base such as polyethylene glycol.

As stated hereinbefore, the 3'-hydroxyl group of neamine and its related aminoglycosidic antibiotics, including the known compound 3'-deoxykanamycin B, is preferentially sulfonylated to the 4'-hydroxyl group thereof when all or part of the other functional hydroxyl groups as well as all the functional amino groups are protected with known blocking groups. The 3'-sulfonic ester group so formed may subsequently be converted into hydrogen by iodination or bromination followed by hydrogenation in a known manner, with the result that selective 3'-deoxylation is achieved. Accordingly, we have succeeded in providing a process by which the new 3'-deoxy compound of the general formula (I) as well as the known substances 3'-deoxyneamine and 3'-deoxykanamycin B can be produced in a facile way starting from the corresponding parent aminoglycosidic antibiotics.

According to a second aspect of this invention, therefore, there is provided a process for the production of the 3'-deoxy derivative of an aminoglycosidic antibiotic, represented by the formula:

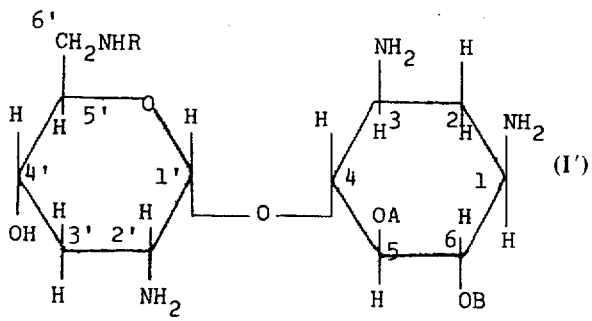

wherein R is a hydrogen atom or an alkyl group of 1–4 carbon atoms; A is a hydrogen atom or β-D-ribofuranosyl group of the formula:

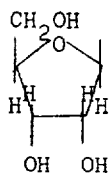

B is a hydrogen atom or 3-amino-3-deoxy-α-D-glucopyranosyl group of the formula:

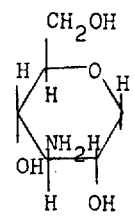

provided that A is not β-D-ribofuranosyl group when B is 3-amino-3-deoxy-α-D-glucopyranosyl group, which comprises protecting all the amino groups and all or a part of the hydroxyl groups other than the 3'-hydroxyl and 4'-hydroxyl groups of a starting compound of the formula:

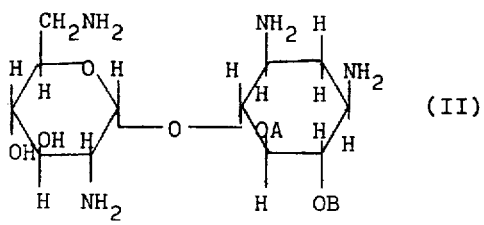

wherein A and B are as defined above to prepare an amino-protected and hydroxyl-protected derivative of the formula:

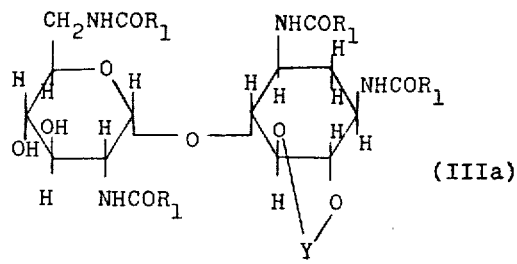

or of the formula:

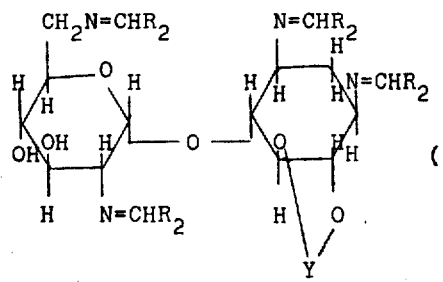 (IIIb)
or of the formula:
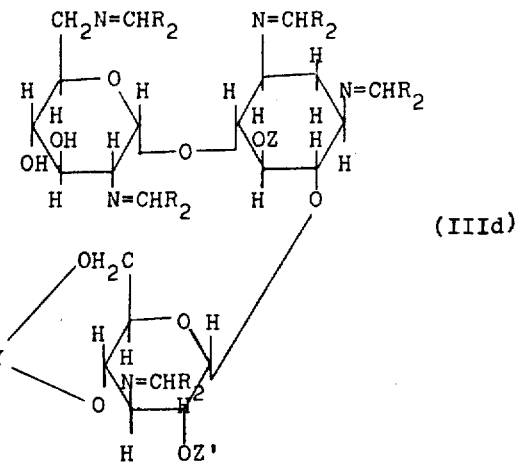 (IIId)
or of the formula:
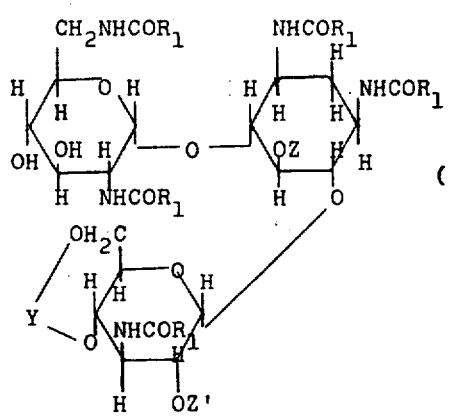 (IIIc)
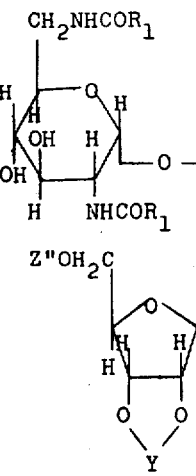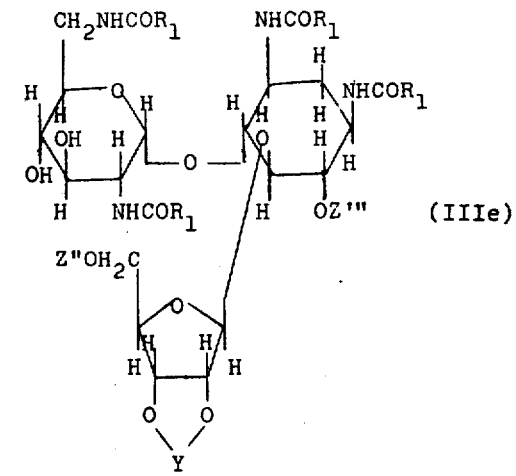 (IIIe)
or of the formula:

or of the formula:

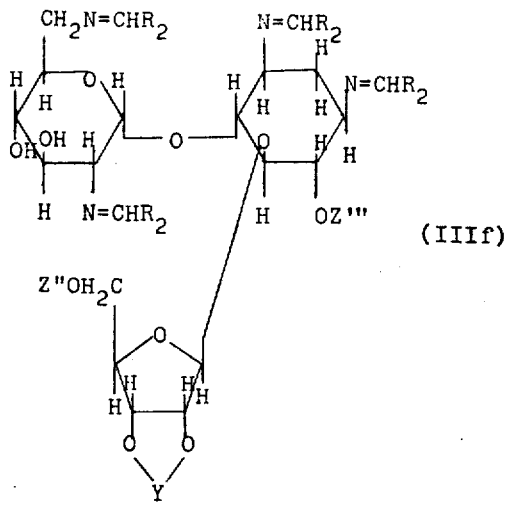

(IIIf)

wherein $R_1$ is a hydrogen atom, an alkyl group (for example, an alkyl group of 1–6 carbon atoms, such as methyl, ethyl, propyl, butyl, and pentyl), an aryl group (for example, phenyl), an alkoxy group (for example, an alkoxy group of 1–6 carbon atoms, such as ethoxy, t-butoxy and t-amyloxy), an aryloxy group (for example, phenoxy) or an arylmethoxy group (for example, benzyloxy and p-nitrobenzyloxy); $R_2$ is a hydrogen atom, an alkyl group (for example, an alkyl group of 1–6 carbon atoms, such as methyl, ethyl, butyl, propyl, isopropyl and pentyl) or an aryl group (for example, phenyl, p-methoxyphenyl or o-hydroxyphenyl); Y is cyclohexylidene group or tetrahydropyranyl group of the formula:

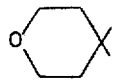

or a group of the formula:

in which P and P' are each a hydrogen atom or an alkyl group (for example, an alkyl group of 1–4 carbon atoms, such as methyl, ethyl, propyl and butyl) or an aryl group (for example, phenyl, p-methoxyphenyl, o-hydroxyphenyl); Z is a hydrogen atom or an acyl group (for example, an alkanoyl group of 2–5 carbon atoms such as acetyl, propionyl and butyryl) or a hemiacetal group or a hemi-ketal group; Z' is a hydrogen atom or an acyl group (for example, an alkanoyl group of 2–5 carbon atoms such as acetyl, propionyl and butyryl, or an aroyl group such as benzoyl), an arylmethyl group (for example, benzyl), and alkylsulfonyl group (for example, an alkylsulfonyl of 1–4 carbon atoms such as methylsulfonyl or ethylsulfonyl), an aralkylsulfonyl group (for example, benzylsulfonyl) or an arylsulfonyl group (for example, phenylsulfonyl or p-tolylsulfonyl); Z'' is an acyl group (for example, an alkanoyl group of 2–5 carbon atoms such as acetyl, propionyl and butyryl, or an aroyl group such as benzoyl) or an arylmethyl group (for example, benzyl); and Z''' is an acyl group (for example, an alkanoyl group of 2–5 carbon atoms such as acetyl, propionyl and butyryl, or an aroyl group such as benzoyl) or an arylmethyl group (for example, benzyl), reacting a sulfonylating agent of the formula:

$$R_3SO_3X \quad (IV)$$

or $$(R_3SO_2)_2O \quad (IV')$$

wherein $R_3$ is an alkyl group, particularly an alkyl group of 1–4 carbon atoms or benzyl group or an aryl group, particularly phenyl and p-tolyl; and X is a halogen atom, particularly chlorine or bromine, with the protected derivative of any of the above formulae (IIIa), (IIIb), (IIIc), (IIId), (IIIe) and (IIIf) to effect a preferential sulfonylation of the 3'-hydroxyl group of said protected derivative, removing the 3'-sulfonic ester group of the resulting sulfonylation product by 3'-iodination or 3'-bromination followed by reduction of the 3'-iodo or 3'-bromo group to produce the 3'-deoxy compound of the aforesaid amino-protected and hydroxyl-protected derivative, and removing the remaining protective groups to produce the 3'-deoxy derivative of the formula (I') wherein R is a hydrogen atom, and then, if desired, 6'-N-alkylating this 3'-deoxy derivative to yield a 3'-deoxy derivative of the formula (I') wherein R is an alkyl group of 1–4 carbon atoms (for example, methyl and ethyl).

In the process of this invention, the protected derivative of any of the formulae (IIIa) to (IIIf) is initially prepared by protecting the functional groups other than the 3'- and 4'-hydroxyl groups of a starting compound of the formula (II) which is neamine, kanamycin B or vistamycin itself. To prepare the protected derivative of any of the formulae (IIIa) to (IIIf), it is convenient to protect at first all the amino groups of the starting compound (II) by acylating, alkoxycarbonylating, aryloxycarbonylating, arylmethoxycarbonylating, alkylidenating or arylidenating the amino groups with a known reagent which is commonly used in the usual synthesis of peptides to provide a known amino-protecting group of the type —$COR_1$ or of the type =$CHR_2$ wherein $R_1$ and $R_2$ are as defined hereinbefore. The starting compound having all the protected amino groups is then treated with a known reagent which is commonly used to provide a known hydroxyl-protecting group of the formula —Y— as defined hereinbefore so that a pair of the 5- and 6-hydroxyl groups of neamine, or a pair of the 4''- and 6''-hydroxyl groups of kanamycin B, or a pair of the 2''- and 3''-hydroxyl groups of vistamycin is protected by the protective group —Y— with the other hydroxyl groups still remaining unprotected. The 5-hydroxyl group of kanamycin B is less active and hence may be kept unprotected, while the 2''-hydroxyl group of kanamycin B is relatively more active and may preferably be acylated, arylmethylated, alkylsulfonylated, aralkylsulfonylated or arylsulfonylated so as to be protected by a hydroxyl-protecting group Z' where Z' is an acyl group, an arylmethyl group, an alkylsulfonyl group, aralkylsulfonyl group or an arylsulfonyl group. However, it is also possible that the 2''-hydroxyl group of kanamycin B remains unprotected and is susceptible to the subsequent sulfonylation which is carried out in the process.

The 5''-hydroxyl group of vistamycin must be protected by acylation of arylmethylation to be blocked with the hydroxyl-protecting group Z'', while the 6-hydroxyl group of vistamycin is less active and may remain unprotected. If desired, however, it is possible to protect the 6-hydroxyl group of vistamycin by acylation or arylmethylation to be blocked with the hydroxyl-protecting group Z''' where Z''' is an acyl or arylmethyl group.

In this way, there is prepared from neamine, kanamycin B or vistamycin an amino-protected and hydroxyl-protected derivative of the formula (IIIa), (IIIb), (IIIc), (IIId), (IIIe) or (IIIf) in which the 3'-hydroxyl and 4'-hydroxyl groups remain unprotected but all or part of the other functional hydroxyl groups are protected and in which all the amino groups are blocked.

In acylating the amino groups of the starting compound (neamine, kanamycin B or vistamycin), the starting compound may be reacted in a known manner with a carboxylic acid of the type $HOOCR_1'$ wherein $R_1'$ is an alkyl group or an aryl such as phenyl, or a known reactive derivative of said carboxylic acid such as acyl halide or anhydride, in a solvent such as aqueous dioxane. Preferred acylating agents for this purpose include acetyl chloride and benzoyl chloride. In alkyloxycarbonylating, aryloxycarbonylating or arylmethoxycarbonylating the amino groups of the starting compound (II), the starting compound may be reacted with a chloroformate of the formula:

Cl—CO—$OR_1''$      (V)

or a p-nitrophenyl carbonate of the formula:

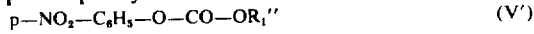
p—$NO_2$—$C_6H_5$—O—CO—$OR_1''$      (V')

or an N-hydroxysuccinimide ester of the formula:

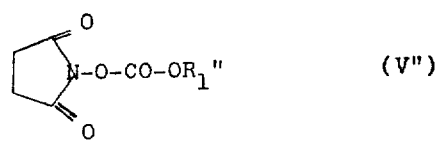
(V'')

or an azidoformate of the formula:

$N_3$—CO—$OR_1''$      (V''')

in which $R_1''$ is an alkyl group, an aryl group or an arylmethyl group, in a suitable solvent such as water, ethanol, acetone or a mixture thereof under neutral or basic conditions in a manner known in the art of peptide synthesis. In alkylidenating or arylidenating the amino groups of the starting compound (II), the starting compound may be reacted with an aldehyde of the formula:

OHC—$R_2$      (VI)

wherein $R_2$ is as defined above, in a manner known in the production of Schiff bases, to protect the amino groups with the protective group =$CHR_2$. Suitable alkylidenating or arylidenating agents for this purpose include acetaldehyde, anisaldehyde, p-nitrobenzaldehyde and salicyl aldehyde.

After the amino groups of the starting compound (II) are protected by the amino-protecting group, all or a part of the functional hydroxyl groups other than the 3'- and 4'-hydroxyl groups of the starting compound are protected. When the starting compound is neamine, the 5- and 6-hydroxyl groups of neamine are protected by cyclohexylidenating, tetrahydropyranylidenating, alkylidenating or arylidenating these hydroxyl groups in a known manner, so that the 5- and 6-hydroxyl groups of neamine are blocked with the protective group —Y— as defined above. When the starting compound is vistamycin, the 2''- and 3''-hydroxyl groups of vistamycin are protected by cyclohexylidenating, tetrahydropyranylidenating, alkylidenating or arylidenating these hydroxyl groups in a known manner, so that the 2''- and 3''-hydroxyl groups of vistamycin are protected with the protective group -Y- as defined in the above. When the starting compound is kanamycin B, the 4''- and 6''-hydroxyl groups of kanamycin B are protected by cyclohexylidenating, tetrahydropyranylidenating, alkylidenating or arylidenating these hydroxyl groups in a known manner, so that the 4''- and 6''-hydroxyl groups of kanamycin B are blocked with the protective group -Y- as defined in the above. Suitable cyclohexylidenating, tetrahydropyranylidenating, alkylidenating or arylidenating agent for this purpose includes 1,1-dimethoxycyclohexane, 1,1-dimethoxytetrahydropyrane, 2,2'-dimethoxypropane and anisaldehyde. The agent may preferably be reacted with the amino-protected derivative of the starting compound (II) in a suitable aprotic organic solvent such as dimethylformamide at a temperature of up to 100°C in the presence of a catalytic amount of an acid such as sulfuric acid and p-toluenesulfonic acid under anhydrous conditions.

When the 5- and 6-hydroxyl groups of neamine, the 2''- and 3''-hydroxyl groups of vistamycin, or the 4''- and 6''-hydroxyl groups of kanamycin B are reacted with a cyclohexylidenating, tetrahydropyranylidenating, alkylidenating or arylidenating agent in the above-mentioned way, it happens occasionally that the 3'- and 4'-hydroxyl groups of the starting compound (II) are also cyclohexylidenated, tetrahydropyranylidenated, alkylidenated or arylidenated. The 3',4'-O-cyclohexylidene, tetrahydropyranylidene, alkylidene or arylidene group so formed may be removed selectively by subjecting to a mild hydrolysis in a lower alkanol such as methanol or ethanol containing a low concentration of a weak acid such as acetic acid or diluted hydrochloric acid, while the 5,6-, or 2'',3''- or 4'',6''-O-cyclohexylidene, tetrahydropyranylidene, alkylidene or arylidene group is retained in the molecule of the protected derivative of neamine, vistamycin or kanamycin B. This selective removal of the 3',4'—O—cyclohexylidene, tetrahydropyranylidene, alkylidene or arylidene group which has occasionally been formed as stated above may preferably be effected after the 2''-hydroxyl group of kanamycin B is protected by acylation, arylmethylation, alkylsulfonylation, aralkylsulfonylation or arylsulfonylation, or after the 6- and 5''-hydroxyl groups of vistamycin are protected by acylation or arylmethylation.

To acylate the 2''-hydroxyl group of kanamycin B or the 6- and 5''-hydroxyl groups of vistamycin, a carboxylic acid of the aforesaid type $HOOCR_1'$ or a known reactive derivative of this acid such as acyl halide or anhydride may be used as the acylating agent. The acylation for this purpose may be carried out in a basic medium such as pyridine at ambient temperature. Preferred acylating agents for this purpose are acetyl chloride, acetic anhydride or benzoyl chloride. Arylmethylation of the 2''-hydroxyl group of kanamycin B or the 6- and 5''-hydroxyl groups vistamycin, benzylation may conveniently be conducted using benzyl halide in a usual manner. If desired, the 5-hydroxyl group of kanamycin B may be protected by acylation in the same manner as the 2''-hydroxyl group of kanamycin B as described above. The 6-hydroxyl group of vistamycin may also be protected by arylmethylation in the same manner as the 5''-hydroxyl group of vistamycin, if desired.

When the 3',4'-O-cyclohexylidene, tetrahydropyranylidene, alkylidene or arylidene group has occasionally been formed as stated above, it is also possible to protect the 2''-hydroxyl group of kanamycin B by alkylsulfonation or arylsulfonation, before the selective removal of the 3',4'-O-cyclohexylidene group etc., takes place. Alkylsulfonation or arylsulfonation of the 2''-hydroxyl group of kanamycin B for this purpose may be achieved by reacting with an alkylsulfonyl halide such as methanesulfonyl chloride or bromide or ethanesulfonyl chloride or bromide, or an arylsulfonyl halide such as benzenesulfonyl chloride, p-toluenesulfonyl chloride or p-bromobenzenesulfonyl chloride in a basic solvent such as pyridine or picoline at a temperature of usually 0°–60°C. The 2''-sulfonic ester group of kanamycin B so formed is inactive to the iodination or bromination which is subsequently carried out in the process of the present invention, so that the 2''-sulfonic ester group of kanamycin B can serve as the protective group for the 2''-hydroxyl group.

In the process of the present invention, the amino-protected and hydroxyl-protected derivative of any of the formulae (IIIa) to (IIIf) prepared in the above way is then reacted with a sulfonylating agent of the above-mentioned formula (IV) to alkylsulfonate, benzylsulfonate or arylsulfonate the 3'-hydroxyl group of said protected derivative preferentially to the 4'-hydroxyl group thereof. Preferential alkylsulfonation of the 3'-hydroxyl group of the protected derivative of any of the formula (IIIa) to (IIIf) may preferably be achieved in such a way that said protected derivative is reacted with an alkylsulfonating agent of the formula:

$$R_3'SO_3X \text{ or } (R_3'SO_2)_2O \qquad (IVa)$$

wherein $R_3'$ is an alkyl group preferably of 1–4 carbon atoms and X is a halogen atom, at most in 1.5 molar proportions in a basic solvent such as pyridine or picolin at a temperature of up to about 50°C for a period of 1–24 hours. Preferential benzylsulfonylation or arylsulfonylation of the 3'-hydroxyl group of the protected derivative of any of the formula (IIIa) to (IIIf) may preferably be achieved when said protected derivative is reacted with a benzylsulfonating or an arylsulfonating agent of the formula:

$$R_3''SO_3X \text{ or } (R_3''SO_2)_2O \qquad (IVb)$$

wherein $R_3''$ is a benzyl or an aryl group such as phenyl, p-tolyl or p-bromophenyl group and X is a halogen atom, in a basic solvent such as pyridine or picolin at a temperature of up to 50°C for a period of 1 to 24 hours. The benzylsulfonylating or arylsulfonating agent of the formula (IVb) may be used at least in a equimolar proportion to the protected derivative of the formula (IIIa) to (IIIf).

When a kanamycin B derivative having the unblocked 2''-hydroxyl group is employed as the protected derivative of the formula (IIIc) or (IIId) and is reacted with the sulfonylating agent of the formula (IV) in the process of the present invention, the unblocked 2''-hydroxyl group can also be sulfonylated occasionally to give the 2''-sulfonic ester group. As stated before, however, this 2''-sulfonic ester group is inactive to the subsequent halogenation and hydrogenation which are carried out later in the process of the present invention, so that it does not hinder the process of the present invention.

In the process of the present invention, the 3'-sulfonic ester group of the sulfonylation product which is obtained from the above-mentioned preferential 3'-sulfonylation stage is then removed by effecting the 3'-iodination or 3'-bromination of the 3'-sulfonylation product followed by reduction (hydrogenation) of the 3'-iodination or 3'-bromination product. To iodinate or brominate the 3'-sulfonic ester group of the sulfonylation product, this sulfonylation product may preferably be reacted with alkali metal iodide or bromide such as sodium iodide, sodium bromide and the like in an aprotic solvent such as dimethylformamide at a temperature of e.g. 100°C, more or less, to give the 3'-iodination or 3'-bromination product. It is preferred that the alkali metal iodide or bromide should be used in the form of a solution containing the iodide or bromide at a concentration of at least 50% saturation in an aprotic solvent. To reduce the 3'-iodination or 3'-bromination product to the 3'-deoxy compound of the amino-protected and hydroxyl-protected derivative, the reduction may be achieved by hydrogenating the 3'-iodination or 3'-bromination product with hydrogen in the presence of a known hydrogenation catalyst such as Raney nickel, platinum or palladium.

The removal of the amino-protecting groups and the hydroxyl-protecting groups which are remaining in the above-mentioned 3'-deoxy compound may be achieved in the following known different ways. Thus, when the amino-protecting group is an acyl group, an alkyloxycarbonyl group or an aryloxycarbonyl group, the removal of this kind of amino-protecting group from the 3'-deoxy compound may be effected by subjecting the 3'-deoxy compound to an alkaline treatment with a base such as aqueous sodium hydroxide or aqueous barium hydroxide. When the amino-protecting group is of an arylidene or alkylidene group, the removal of this kind of amino-protecting group from the 3'-deoxy compound may be effected by subjecting the 3'-deoxy compound to a moderate hydrolysis treatment with an acid such as aqueous trifluoroacetic acid, aqueous acetic acid and diluted hydrochloric acid. When the amino-protecting group is of an arylmethoxycarbonyl group such as benzyloxycarbonyl, the removal of this sort of amino-protecting group may be effected by subjecting the 3'-deoxy compound to a hydrogenolysis treatment in the presence of a palladium-carbon catalyst or to an alkaline treatment as described above. When the hydroxyl-masking group is of the acyl type such as alkanoyl and, removal of this acyl type of the hydroxyl-masking group may be accomplished by alkaline hydrolysis using aqueous sodium hydroride, ammonia in methanol or sodium methylate in methanol. When the hydroxyl-masking group is of isopropylidene, cyclohexylidene, benzylidene, tetrahydropyranyl or methoxycyclohexyl, the removal of this type of hydroxyl-masking group may be accomplished by mild hydrolysis using diluted hydrochloric acid or aqueous acetic acid. However, occasionally the hydroxyl-masking groups of the acyl type can partially be removed during removal of the amino-masking group of a similar acyl type. When the hydroxyl-masking group is of such type as benzyl, the removal of this type of the hydroxyl-masking group may be achieved by catalytic hydrogenolysis in the presence of palladium on carbon.

The removal of the remaining amino-protecting group and hydroxyl-protecting group from the above-mentioned 3'-deoxy compound gives the 3'-deoxy derivative of the formula (I') where R is a hydrogen atom. If desired, this 3'-deoxy derivative may further be 6'-N-alkylated to produce such a 3'-deoxy-6'-N-alkyl derivative of the formula (I') where R is an alkyl of 1–4 carbon atoms.

The 6'-N-alkylation of the 3'-deoxy derivatives of the formula (1') wherein R is a hydrogen atom may be conducted in various known ways.

For instance a 3'-deoxy derivative of the formula (I') wherein R is hydrogen may be 6'-N-alkylated selectively in such a manner that said 3'-deoxy derivative (I') is reacted with an acylating agent such as an acyl halide of the formula:

$$R_4\text{—COW} \quad (VII)$$

where $R_4$ is an alkyl group of 1–3 carbon atoms and W is a halogen atom such as chlorine or bromine, or the corresponding acid anhydride thereof, or a compound of the formula:

$$R_5\text{—OCOW'} \quad (VIII)$$

wherein $R_5$ is an alkyl, aralkyl or aryl group and W' is H chlorine atom, and aryloxy group or succiniminoxy group. Among the many amino groups of said 3'-deoxy derivative (I'), the 6'-amino group is the most reactive to the acylating agent, so that the 6'-N-acylated product of said 3'-deoxy derivative (I') is formed preferentially when the 3'-deoxy derivative (I) is treated with the acylating agent (VII) or (VIII) as stated above. The 6'-N-acylated product so formed may then be hydrogenated in a known manner such as using lithium aluminum hydride or diborane to produce the 3'-deoxy-6'-N-alkyl compound of the formula (I') wherein R is an alkyl group.

Substantially selective 6'-N-methylation of the 3'-deoxy derivative of the formula (I') where R is hydrogen may be achieved with success when said 3'-deoxy derivative (I') is N-carbobenzyloxylated by reacting with benzyloxycarbonyl chloride, benzyzl p-nitrophenyl carbonate or N-(benzyloxycarbonyloxy) succinimide to effect a selective formation of the 6'-N-benzyloxycarbonylation product of said 3'-deoxy derivative (I'), which is subsequently subjected to hydrogenolysis with lithium aluminum hydride or diborane in solution in an inert organic solvent such as tetrahydrofuran to afford the 6'-methylamino derivative of the 3'-deoxy derivative (I'), that is, the new compound of the formula (I) where R is the methyl value.

Accordingly, the process of this invention may comprise further 6'-N-methylating a 3'-deoxy compound of the formula (I') where R is hydrogen, by reacting this 3'-deoxy compound with benzyloxycarbonyl chloride, benzyl p-nitrophenyl carbonate or N-(benzyloxycarbonyloxy) succinimide to prepare the 6'-N-benzyloxycarbonylation product of the 3'-deoxy compound (I'), and then treating this 6'-N-benzyloxycarbonylation product with lithium aluminum hydride or diboran to give the 6'-N-methyl derivative of the 3'-deoxy compound (I'), that is, a compound of the formula (I) where R value is methyl.

According to a further embodiment of the process of the present invention, there is provided a process for the production of 3'-deoxykanamycin B, which comprises protecting all the amino groups and all or a part of the hydroxyl groups other than 3'-hydroxyl and 4'-hydroxyl groups of kanamycin B to prepare an amino-protected and hydroxyl-protected derivative of the formula:

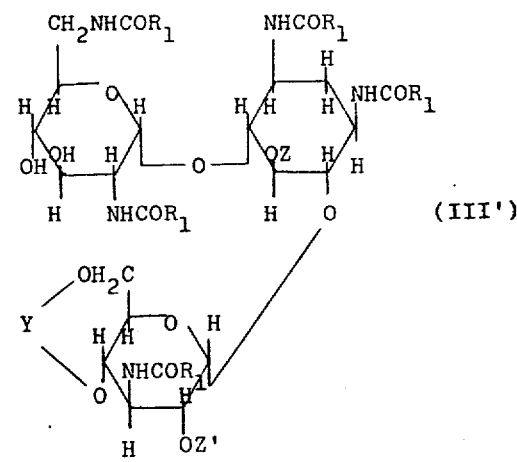

or of the formula:

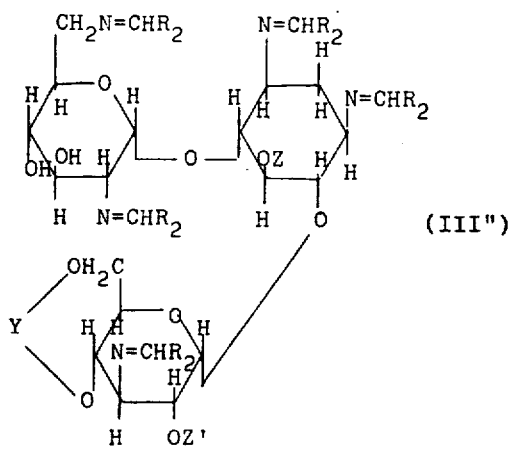

(III'')

wherein $R_1$ is a hydrogen atom, an alkyl group, an aryl group, an alkoxyl group, an aryloxy group or an arylmethoxy group; $R_2$ is a hydrogen atom, an alkyl group or an aryl group; Y is cyclohexylidene group or tetrahydropyranyl group or a group of the formula:

in which P and P' are each a hydrogen atom, an alkyl group or an aryl group; Z is a hydrogen atom, an acyl group, a hemi-acetal group or a hemi-ketal group; Z' is a hydrogen atom, an acyl group, an arylmethyl group, an alkylsulfonyl group, an aralkylsulfonyl group or an arylsulfonyl group, or reacting a sulfonylating agent of the formula:

 (IV)

or

 (IV')

wherein $R_3$ is an alkyl group, benzyl group or an aryl group and X is a halogen atom, with the protected derivative of any of the above formulae (III') to (III'') to effect a preferential sulfonylation of the 3'-hydroxyl group of said protected derivative, removing the 3'-sulfonic ester group of the resulting sulfonylation product by 3'-iodination or 3'-bromination followed by reduction of the 3'-iodo or 3'-bromo group to produce the 3'-deoxy compound of the aforesaid amino-protected and hydroxyl-protected derivative of kanamycin B, and removing the remaining protective groups to produce the 3'-deoxykanamycin B.

The invention is now illustrated with reference to the following Examples to which the invention is not limited in any way.

EXAMPLE 1

Synthesis of 3'-deoxykanamycin B a. Preparation of 2''-D-benzoyl-4'',6''-O-cyclohexylidenepenta-N-ethoxycarbonyl-kanamycin B i. Preparation of penat-N-salicylidenekanamycin B.

To a suspension of kanamycin B base (400 mg) in aqueous methanol (1:8, 20 ml), salicylaldehyde (520 mg) was added and the resulting solution was poured into water. Precipitates were filtered and dried, yielding 750 mg.

ii. Preparation of 3',4';4'',6''-di-O-cyclohexylidenepenta-N-salicylidenekanamycin B.

Penta-N-salicylidenekanamycin B (700 mg) prepared by the above procedure (i) was dissolved in dry dimethylformamide (12 ml) and the solution, after addition of 1,1-dimethoxy cyclohexane (500 mg) and anhydrous p-toluene-sulfonic acid (30 mg), was heated at 50°C for 1 hour, and then a small amount of the solvent was removed by evaporation in vacuo. The resulting solution was poured into aqueous sodium hydrogen carbonate solution. Precipitates formed which were filtered and dried to yield 710 mg.

iii. Preparation of 2''-O-benzoyl-3',4'; 4'',6''-di-O-cyclohexylidene-penta-N-salicylidenekanamycin B.

The kanamycin B derivative (590 mg) prepared by the above procedure (ii) was dissolved in pyridine (10 ml) and to the solution, benzoyl chloride (120 mg) was added. After allowing to stand at room temperature for 1 hour, the solution was poured into water. Precipitates occurred and were filtered and dried to yield 612 mg.

iv. Preparation of 2''-O-benzoyl-4'',6''-O-cyclohexylidene-penta-N-ethoxycarbonylkanamycin B.

A solution of the kanamycin B derivative (600 mg), prepared by the above procedure (iii) in aqueous acetic acid (1;3, 20 ml) was heated at 95°C for 30 minutes. The reaction mixture was evaporated and the residue was treated with ether. The ether insoluble part was dissolved in aqueous acetone (1:1, 15 ml), and the solution, after addition of anhydrous sodium carbonate (400 mg), was admixed with ethoxycarbonyl chloride (270 mg). Stirring was continued for 5 hours at room temperature. The resulting precipitates were filtered, washed with water and dried to give a solid (515 mg), $[\alpha]_D^{20} + 98°$ (c 1.5, dimethyl-formamide).

b. Production of 2''-O-benzoyl-penta-N-ethoxycarbonyl-4'',6''-O-cyclohexylidene-3'-O-tosylkanamycin B.

2''-O-Benzoyl-penta-N-ethoxycarbonyl-4'',6''-O-cyclohexylidene-kanamycin B [in the aforesaid formula (IIIc); $R_1=OC_2H_5$, $Y=(CH_2)_5C<$, $Z=H$, $Z'=\lambda COC_6H_5$] prepared in the above stage (a), (4.17 g) was dissolved in 80 ml of anhydrous pyridine. The solution, after addition of 3.9 g of tosyl chloride, was allowed to stand at 25°C overnight. After addition of 0.5 ml of water, the solution was concentrated to give a solid which was then dissolved in chloroform. The solution was washed with water, dried with anhydrous sodium sulfate and filtered. The solution was further concentrated to afford a solid which was then dissolved in acetone. After removing the insoluble matter by filtration, the solution in acetone was concentrated to give 4.7 g of a solid. This solid was chromatographically purified by means of a silica gel column and using chloroform-isopropanol as the developing solvent. Yield 2.7 g. $[\alpha]_D + 78°$ (c 0.5, chloroform).

Elemental analysis:
Found: C 53.90, H 6.58, N 5.67 S 3.00%.
Calcd. for $C_{53}H_{75}N_5O_{23}S$:
C $_{53.84}$, H 6.40, N 5.93, S 2.71%.

Production of 2''-O-benzoyl-3'-deoxy-penta-N-ethoxycarbonyl-4'',6''-O-cyclohexylidene-kanamycin B.

The 3'-O-tosylkanamycin B derivative (109 mg) prepared in the above procedure (b) was dissolved in 2 ml of dimethylformamide, and to the resulting solution was added 1.1 g of sodium iodide. The mixture was heated at 100°C for 24 hours to effect the 3'-iodination. The reaction mixture was admixed with a large volume of chloroform, washed with water, dried with anhydrous sodium sulfate and then filtered. The filtrate was concentrated to give 75 mg of a solid which was then dissolved in 2 ml of methanol. The solution was subjected to hydrogenation with hydrogen at 3 atms. in the presence of Raney nickel as the catalyst. The hydrogenation was continued for 10 hours at 50°C, and the reaction mixture was then filtered to remove the catalyst. The filtrate was concentrated to dryness to give a solid. Yield 38 mg. $[\alpha]_D + 84°$ (c 1, dimethylformamide).

Elemental analysis
Found: C 54.58, H 6.80, N 6.84%.
Calcd. for $C_{46}H_{69}N_5O_{20}$:
C 54.59, H 6.87, N 6.92%.

d. Synthesis of 3'-deoxykanamycin B

The 3'-deoxy-kanamycin B derivative (46 mg) produced in the above procedure (c) was added to a solution of 1 g. of barium hydroxide octahydrate in 5 ml of water, and the aqueous suspension so formed was stirred at 100°C for 12 hours to effect the reaction by which the ethoxycarbonyl groups and the benzoyl group were removed from said derivative. Into the reaction mixture was then passed gaseous carbon dioxide, and the precipitate deposited was filtered off. The solution was concentrated to dryness. The resulting solid residue was taken up into 3 ml of 1N hydrochloric acid and the solution was heated for 1 hour under reflux to remove the hexylidene group. The solution was subsequently concentrated to dryness to give a solid, which was then dissolved in a small volume of water. The aqueous solution was poured into a column of CM-Sephadex C-25 (a product of Pharmacia Co., Sweden; a weak cation-exchanger comprising of a three dimensional network gel of dextran bearing carboxymethyl radicals as the weakly cation-exchanger functions, ($NH_4^+$ form). The column was washed with water and then eluted with 0.03% -0.1% aqueous ammonia with increasing gradually the concentration of ammonia in the aqueous ammonia. Such fractions of the eluate containing the desired substance having the antibacterial activity to *Staphylococcus aureus* FDA 209P were collected and combined together. The combined solution was concentrated to dryness to afford a powder of the desired 3'-deoxykanamycin B. Yield 31 mg. $[\alpha]_D + 125°$ (c 1, water).

Elemental analysis:
Found: C 44.28, H 8.31, N 14.15%.
Calcd. for $C_{18}H_{37}N_5O_9 \cdot H_2O$:
C 44.53, H 8.10, N 14.43%.

EXAMPLE 2

Synthesis of 3'-deoxykanamycin B a. Preparation of penta-N-anisylidenekanamycin B.

To a suspension of kanamycin B base (1 g) in methanol (60 ml), anisaldehyde (1.3 g) was added and the mixture was stirred for 1 hour. The resulting solution was evaporated and the residue was extracted with chloroform. Concentration of the solution followed by addition of ethyl ether gave a solid comprising penta-N-anisylidenekanamycin B. Yield 1.6 g.

b. Preparation of penta-N-anisylidene-4'',6'-O-anisylidenekanamycin B.

Penta-N-anisylidenekanamycin B (500 mg) prepared in the above procedure (a) was dissolved in dry dimethylformamide (15 ml), and after addition of anisaldehyde (110 mg) and anhydrous p-toluenesulfonic acid (100 mg), the solution was heated at 50°C for 1 hour and evaporated in vacuo. The resulting syrup was poured into water which had been saturated with sodium hydrogen carbonate. The resulting glassy precipitate was extracted with chloroform, and evaporation of the extract solution gave a solid of penta-N-anisylidene-4'',6''-O-anisylidenekanamycin B. Yield 470 mg.

c. Production of penta-N-anisylidene-4'', 6''-O-anisylidene-3', 2''-di-O-tosylkanamycin B.

Penta-N-anisylidene-4'', 6''-O-anisylidenekanamycin B [in the aforesaid formula (IIId): $R_2= -C_6H_4OCH_3$,

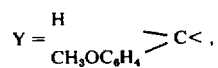

$Z=Z'=H$]
(1 mol. equivalent) prepared in the above procedure (b) was dissolved in pyridine, and 4 mol equivalents of tosyl chloride was added to the solution. The solution was allowed to stand at room temperature overnight. After addition of small amount of triethylamine, the solution was evaporated and the residue was poured into water containing sodium hydrogen carbonate. The resulting precipitate was collected, washed with water and dried. This precipitate was identified as the above titled compound. Yield was 83%. Although this product was contaminated with small proportion of the other tosylation derivatives, the product from the 3'-tosylkanamycin B derivative was the only major product and could be used in the subsequent reactions without difficulties.

Elemental analysis
Found: C 64.29, H 5.68, N 4.51, S 4.08%
Calcd. for $C_{80}H_{85}N_5O_{20}S_2$:
C 64.03, H 5.71, N 4.67, S 4.27% d. Production of penta-N-anisylidene-4'', 6''-O-anisylidene-3'-deoxy-2''-O-tosylkanamycin B.

The product of the above procedure (c) was treated in the same manner as in Example 1, (c), by reaction with sodium iodide followed by hydrogenation. Since a part of the anisylidene groups were removed during the iodination step, the anisylidene group was reintroduced by an usual manner. The above titled product was afforded.

Elemental analysis
Found: C 66.10, H 5.94, N 5.37, S 2.55%.
Calcd. for $C_{73}H_{79}N_5O_{17}S$:
C 65.90, H 5.98, N 5.26, S 2.41%.

e. Production of 3'-deoxykanamycin B.

To a solution of the product of the above procedure (d) (300 mg) in 10 ml of a solvent mixture of methanol-dioxane-water (5:5:1), 2 g of 2.5% sodium amalgum was added, and the admixture was shaken at room temperature overnight during which the 2''-tosyl group was removed by hydrolysis. After introducing carbon dioxide, the reaction mixture was filtered to remove the mercury and other precipitates. The solution was evaporated to give a solid, which was then stirred into a mixture of 1N hydrochloric acid and benzene to split off the anisylidene groups. After removing the benzene layer, the aqueous solution was washed with benzene. A basic ion-exchange resin (Dowex 1 X 2, OH form, product of Dow-Chemical Co.) was added to the solution until it became weakly acidic. After filtration, the aqueous solution was evaporated and the residue was dissolved in water, charged in a column of CM-Sephadex C-25 ($NH_4^+$ form) and developed with aqueous ammonia with linear increase in the ammonia concentration (0 to 0.3N). 3'-deoxykanamycin B was obtained as a powder in a yield of 73 mg.

EXAMPLE 3

Synthesis of 3'-deoxykanamcycin B a. Preparation of penta-N-ethoxycarbonylkanamycin B.

To a stirred mixture of kanamycin B free base (1.0 g) and anhydrous sodium carbonate (0.9 g) in aqueous acetone (1:1, 20 ml), ethoxycarbonyl chloride (1.05 ml) was added and the stirring was continued for 5 hours at room temperature. The resulting precipitates were filtered, washed with water and dried to give a solid (1.46 g), mp. 305° (decomp.), $[\alpha]_D^{15} + 88°$ (c 0.5, dimethylformamide).

b. Preparation of 4'', 6''-O-cyclohexylidene-penta-N-ethoxycarbonylkanamycin B [in the aforesaid formula (IIIc);
$R_1$= $OC_2H_5$, Y=cyclohexylidene, Z=Z'=H].

Penta-N-ethoxycarbonylkanamycin B (5.1 g) was dissolved in dimethylformamide (10 ml), and 1,1-dimethoxy cyclohexane (6 ml) and sulfuric acid (0.24 ml) were added to the solution. The admixture was allowed to stand at ambient temperature for 2 hours. Another 1,1-dimethoxy cyclohexane (6 ml) was added and the solution was again allowed to stand for 2 hours. The reaction mixture was poured into water and the resulting precipitate was collected and washed with water, giving a solid of the above titled product. Yield 4.5 g. $[\alpha]_D^{25} + 66°$ (c 1, dimethylformamide).

Elemental analysis
Found: C 50.80, H 7.65, N 7.52%.
Calcd. for $C_{39}H_{65}N_5O_{20}$:
C 50.68, H 7.10, N 7.58%.

c. Production of 4'', 6''-O-cyclohexylidene-penta-N-ethoxycarbonyl-3', 2''-di-O-tosylkanamycin B.

The product of the above procedure (b) (2.0 g) was dissolved in pyridine (30 ml) and tosyl chloride (3.4 g) was added to the solution. The solution was allowed to stand at room temperature for 17 hours. After addition of a small amount of water followed by allowing to stand for 1 hour, the reaction mixture was poured into a large volume of water. The resulting precipitate was collected and the product was chromatographed on a column of silica gel with chloroform-ethanol (60:1). Fractions of the eluate containing the above titled compound were pooled and evaporated to give a solid, 1.85 g. $[\alpha]_D^{25} + 82°$ (c 1, dimethylformamide).

Elemental analysis
Found: C 51.24, H 6.70, N 5.21, S 4.85%.
Calcd. for $C_{53}H_{79}N_5O_{24}S_2$:
C 51.56, H 6.46, N 4.67, S 5.18%.

d. Production of 4'', 6''-O-cyclohexylidene-3'-deoxypenta-N-ethoxycarbonyl-2''-O-tosylkanamycin B.

The product of the above procedure (c) (1.5 g) was treated in the same manner as in Example 1, (c) by reaction with sodium iodide followed by hydrogenation. The above titled compound was afforded. Yield 470 mg. mp. 198°–206°C (decomp.).

Elemental analysis
Found: C 51.52, H 6.53, N 6.04, S 2.74%.
Calcd. for $C_{46}H_{72}N_5O_{21}S$:
C 51.96, H 6.83, N 6.58, S 3.00%.

e. Production of 3'-deoxykanamycin B.

The product of the above procedure (d) (200 mg) was dissolved in dioxane, and after addition of small amount of sodium methoxide, the solution was irradiated under ultra-violet ray lamp (254 m$\mu$) under nitrogen for 20 hours to effect the removal of the 2''-tosyl group. The detosylated product was then treated similarly as described in Example 1, (d) to effect the removal of the ethoxycarbonyl groups and the cyclohexylidene group. 3'-Deoxykanamycin B was afforded in a yield of 26 mg.

EXAMPLE 4

Synthesis of 3'-deoxykanamycin B a. Preparation of penta-N-ethoxycarbonyl-3', 4'; 4'', 6''-di-O-isopropylidenekanamycin B.

The penta-N-ethoxycarbonylkanamycin B (13.7 g) prepared by the procedure described in Example 3 (a) was dissolved in dimethylformamide (70 ml) and the solution, after addition of 2,2-dimethoxypropane (18.8 g) and anhydrous p-toluenesulfonic acid (0.35 g), was heated at 65°C for 1 hour. The resulting solution was concentrated to approximately 50 ml and, after addition of 2,2-dimethoxypropane (30 g), the solution was again heated at 65°C for 1 hour. Triethylamine (6 ml) was added and the solution was poured into a stirred mixture of benzene (500 ml) and water (500 ml), whereupon a solid precipitated (Solid A). After removal of the Solid A by filtration, the benzene layer was allowed to stand. The precipitates formed were filtered, washed with benzene and water and dried to give a solid of penta-N-ethoxycarbonyl-3', 4'; 4'', 6''-di-O-isopropylidenekanamycin B, 3.5 g, mp. 236°–237°C, $[\alpha]_D^{20} + 87°$ (c 1, dimethylformamide).

The solid A obtained (8.1 g) was proved to be penta-N-ethoxycarbonyl-4'', 6''-O-isopropylidenekanamycin B.

b. Preparation 2''-O-benzoyl-penta-N-ethoxycarbonyl-3', 4'; 4'', 6''-di-O-isopropylidenekanamycin B.

The kanamycin B derivative (3.24 g) prepared by the above procedure (a) was dissolved in pyridine (48 ml) and to the solution, benzoyl chloride (2 g) was added.

After allowing to stand at room temperature for 1 hour, the solution was evaporated and the residue was dissolved in chloroform. The solution was washed with water, dried over sodium sulfate and concentrated to approximately 20 ml. Addition of n-hexane gave crystals, 3.35 g, mp. 205°–209°C, $[\alpha]_D^{21} + 114°$ (c 1, dimethylformamide).

c. Preparation of 2″-O-benzoyl-penta-N-ethoxycarbonyl-4″, 6″-O-isopropylidenekanamycin B.

The kanamycin B derivative (2.82 g) prepared by the above procedure (b) was dissolved in aqueous acetic acid (1:3, 40 ml) and the solution was heated at 95°C for 30 minutes. The resulting solution was evaporated and the deacetonated product obtained (2.58 g) was dissolved in dimethylformamide (15 ml) and, after addition of 2,2-dimethoxypropane (0.65 g) and anhydrous p-toluenesulfonic acid (55 mg), the solution was allowed to stand at room temperature for 1 hour. The solution was poured into water and the resulting precipitates were filtered, washed with water and treated with benzene to give the above titled compound as a benzene-insoluble solid, 2.01 g, mp. 285°–287°C, $[\alpha]_D^{21} + 105°$ (c 1, dimethylformamide).

d. Production of 2″-O-benzoyl-penta-N-ethoxycarbonyl 4″,6″-O-isopropylidene-3′-O-tosylkanamycin B.

The kanamycin B derivative (1.18 g) prepared by the above procedure (c) was dissolved in pyridine (15 ml) and the solution, after addition of tosyl chloride (1.0 g), was allowed to stand at room temperature for 5 hours. The reaction mixture was subsequently treated similarly as described in Example 1, (b). 2″-O-benzoyl-penta-N-ethoxycarbonyl-4″, 6″-O-isopropylidene-3′-O-tosylkanamycin B was afforded in a yield of 1.06 g. $[\alpha]_D + 83°$ (c 1, chloroform).

e. Production of 2″-O-benzoyl-3′-deoxy-penta-N-ethoxycarbonyl-4″, 6″-O-isopropylidene-kanamycin B.

The 3′-O-tosylkanamycin B derivative (150 mg) produced in the above procedure (d) was dissolved in 3 ml of dimethylformamide and the solution, after addition of 2.0 g of lithium bromide, was heated at 100°C for 24 hours to effect the 3′-bromination. The reaction mixture was admixed with a large volume of chloroform, washed with water, dried with anhydrous sodium sulfate and then filtered. The solution was concentrated and the residue solid (110 mg) was taken up into 3 ml of methanol. The solution was subjected to hydrogenation in the presence of palladium black and with hydrogen at 3 atms. The above titled compound was obtained in a yield of 56 mg.

f. Production of 3′-deoxykanamycin B

The product of the above procedure (e) (50 mg) was treated in the same manner as in Example 1(d), affording 3′-deoxykanamycin B. Yield 22 mg.

EXAMPLE 5

Synthesis of 3′-deoxyneamine a. Preparation of tetra-N-ethoxycarbonylneamine.

Neamine hydrochloride (1.02 g) was suspended in a mixture of 1:1 water-acetone (20 ml) and the suspension was admixed with basic lead carbonate (7 g) and then with ethyl chloroformate (1.01 g). The admixture was stirred at ambient temperature for 3 hours and then the reaction mixture was filtered. The filtrate was concentrated to a volume of about 60 ml and the concentrated solution was admixed with 1.5 ml of granules of a strongly basic anion-exchange resin consisting of a styrene-divinylbenzene copolymer containing quaternary ammonium groups as the functional groups (OH form, commercially available under a trade name "Dowex" 1 × 2, a product of Dow Chemical Co., U.S.A.) under stirring. The mixture was filtered and the filtrate was concentrated to give 1.07 g of the above titled compound as a colorless solid.

b. Preparation of tetra-N-ethoxycarbonyl-5,6-O-cyclohexylideneneamine.

Tetra-N-ethoxycarbonylneamine (5.4 g) prepared in the above procedure (a) was suspended in 55 ml of dimethylformamide and further admixed with 5.8 ml of cyclohexanone dimethylketal and 0.17 g of anhydrous p-toluenesulfonic acid. The mixture was heated at 50°C for 1.5 hours under a reduced pressure of 20 mmHg and allowed to stand at ambient temperature and pressure for 20 hours. The reaction mixture was admixed with 3 ml of methanol, heated at 45°C for 1.5 hours and then neutralized by an aqueous solution of sodium hydrogen carbonate. The mixture was concentrated under a reduced pressure and the residue was extracted with chloroform. The extract was washed with a small volume of a saturated aqueous solution of sodium chloride, dried with anhydrous sodium sulfate and concentrated to dryness. The solid residue was identified as the above titled product. Yield 4.3 g. $[\alpha]_D^{25} + 37°$ (c 1, methanol).

c. Production of tetra-N-ethoxycarbonyl-5,6-O-cyclohexylidene-3′-O-tosylneamine.

Tetra-N-ethoxycarbonyl-5,6-O-cyclohexylideneneamine [in the aforesaid formula (IIIa); $R_1 = OC_2H_5$, $Y = (CH_2)_5C<$] (1.23 g) prepared in the above procedure (b) was dissolved in dry pyridine (20 ml) and the solution, after addition of 0.9 g of tosyl chloride, was allowed to stand at 25°C overnight to effect the 3′-tosylation. The reaction mixture was subsequently processed in the same manner as in Example 1, (b) to give the above titled compound as a solid. Yield of 0.77 g. $[\alpha]_D + 28°$ (c 1, methanol).

d. Preparation of 5,6-O-cyclohdexylidene-3′-deoxytetra-N-ethoxycarbonylneamine.

The 3′-O-tosylneamine derivative (128 mg) produced in the above procedure (c) was dissolved in 2 ml of dimethylformamide and the solution, after addition of 1.1 g of sodium iodide, was heated at 100°C for 18 hours to effect the 3′-iodination, that is, the replacement of the 3′-tosylate group by the iodo substituent. The reaction mixture was subsequently processed in the same manner as in Example 1, (c) to give the above titled compound. Yield 61 mg. $[\alpha]_D + 35°$ (c 1, methanol).

Elemental analysis

Found: C 53.49, H 7.50, N 8.22% Calcd. for $C_{30}H_{50}N_4O_{13}$: C 53.40, H 7.47, N 8.30.

e. Production of 3′-deoxyneamine.

The 3′-deoxyneamine derivative (160 mg) produced in the above procedure (d) was processed in the same manner as in Example 1, (d) to remove the ethoxycarbonyl groups and cyclohexylidene group. 3′-Deoxyneamine was affored as a colorless powder in a yield of 43 mg. $[\alpha]_D + 98°$ (c 1, water).

EXAMPLE 6

Synthesis of 3′-deoxyneamine a. Preparation of tetra-N-benzoyl-5,6-O-cyclohexylideneamine.

Neamine free base (2.0 g) was treated with benzoyl chloride (3.5 g) and sodium carbonate (2.5 g) in aqueous dioxane (1:1). The reaction mixture was evaporated and the residue was extracted with hot dimethylformamide. The solution was evaporated in vacuo to give a crude tetra-N-benzoylneamine. This product was then reacted with 1,1-dimethoxy cyclohexane (2 g) in the presence of p-toluenesulfonic acid (100 mg) at 50°C in dimethylformamide under reduced pressure (ca. 35 mmHg). The solution was allowed to stand overnight at ambient temperature. Methanol (2 ml) was added to the solution which was then again allowed to stand at 45°C for 2 hours. After addition of 0.3N barium hydroxide solution (5 ml), the mixture was evaporated and the residue was extracted with dimethylformamide. Evaporation gave the above titled product in a yield of 4.2 g.

b. Production of tetra-N-benzoyl-5,6-O-cyclohexylidene-3'-O-tosylneamine.

Tetra-N-benzoyl-5,6-O-cyclohexylidene-neamine (in the aforesaid formula (IIIa); $R_1=C_6H_5$, $Y=(CH_2)_5C<$](4.2 g) prepared in the above procedure (a) was dissolved in pyridine-dimethylformamide and the solution was reacted with tosyl chloride in the same manner as in Example 5, (c). After addition of a small amount of triethylamine, the reaction mixture was evaporated to give a solid. This solid was chromatographed in a column of silica gel with chloroform containing 1% triethylamine. Fractions of the eluate containing the above titled compound were evaporated to give a solid. Yield 1.1 g.

Elemental analysis
Found: C 65.41, H 5.75, N 5.66, S 3.03%.
Calcd. for $C_{53}H_{56}N_4O_{12}S$:
C 65.42, H 5.80, N 5.76, S 3.29%.

c. Production of 3'-deoxyneamine.

The solid product of the above procedure (b) was processed similarly as described in Example 1, (c) to give tetra-N-benzoyl-5,6-O-cyclohexylidene-3'-deoxyneamine. This product was further treated in the same manner as in Example 1, (d) by hydrolysis. 3'-Deoxyneamine was afforded in a yield of 53%.

EXAMPLE 7

Synthesis of 3'-deoxyvistamycin a. Preparation of tetra-N-ethoxycarbonylvistamycin.

Vistamycin sulfate (5.0 g) was suspended in 100 ml of a mixture of water-acetone (1:1) and the suspension, after addition of anhydrous sodium carbonate (3.5 g) and ethyl chloroformate (4.15 g) was stirred for 1 hour at room temperature. The reaction mixture was concentrated to dryness to give a solid, which was then extracted with hot dry acetone. The extract was concentrated to give a solid of the above titled compound. Yield 5.7 g. mp. 143°–145°C. $[\alpha]_D^{23} + 43°$ (c 2, acetone).

b. Preparation of tetra-N-ethoxycarbonyl-3', 4'; 2'', 3''-di-O-cyclohexylidenevistamycin.

Tetra-N-ethoxycarbonylvistamycin (2.5 g) prepared in the above procedure (a) was dissolved in 25 ml of dimethylformamide and the solution, after addition of 5.1 ml of cyclohexanone dimethylketal and 0.07 g of anhydrous p-toluenesulfonic acid, was heated at 50°C for 1 hour at a reduced pressure of 25 mmHg to effect the 3', 4': 2'', 3''-di-O-cyclohexylidenation. The reaction mixture was poured into 0.1N aqueous barium hydroxide solution, the precipitate deposited was filtered and dried and the resulting solid was chromatographed in a column of 100 g. of silica gel using 1:4 benzene-ethyl acetate as the development solvent. Such fractions of the eluate containing the above titled compound were collected together and concentrated to dryness. Yield 1.8 g. Recrystallisation from benzene-n-hexane gave the above titled product of mp. 133°–136°C. $[\alpha]_D^{23} + 41°$ (c 2, acetone).

Elemental analysis
Found: C 54.69, H 7.60, N 6.04%.
Calcd. for $C_{41}H_{66}N_4O_{18}$:
C 54.54, H 7.37, N 6.20%.

c. Preparation of 6,5''-di-O-acetyl-tetra-N-ethoxycarbonyl-3', 4': 2'', 3''-di-O-cyclohexylidenevistamycin.

The vistamycin derivative (3.0 g) prepared in the above procedure (b) was dissolved in 60 ml. of pyridine and the solution, after addition of 2.2 g of acetyl chloride, was warmed at 30°C overnight to effect the acetylation. The reaction mixture was concentrated and the solid residue was dissolved in chloroform. The solution was washed with water, dried over anhydrous sodium sulfate and concentrated to dryness under reduced pressure. The residue was again dissolved in methanol and the solution was treated with active carbon for decoloration and then again concentrated to dryness. The solid residue was recrystallised from benzene-n-hexane to give a solid of the above titled product. Yield 2.7 g. $[\alpha]_D^{22} + 43°$(c 1, acetone).

d. Preparation of 6,5''-di-O-acetyl-tetra-N-ethoxycarbonyl-2'',3''-O-cyclohexylidenevistamycin [in the aforesaid formula (IIIe); $R_1=OC_2H_5$, $Y=$cyclohexylidene, $Z''=Z'''=CH_3CO$].

The vistamycin derivative (3.0 g) prepared in the above procedure (c) was dissolved in 60 ml of a mixture of acetone-acetic acid-water (4:3:2) and the solution was heated at 80°C for 15 minutes to effect a mild hydrolysis whereby the selective removal of the 3', 4'-cyclohexylidene group took place. The reaction mixture was concentrated at a low temperature (Ca 5°C) and the residue was dissolved in chloroform. The solution was washed with an aqueous solution of sodium hydrogen carbonate and then with water, dried over anhydrous sodium sulfate and concentrated to dryness. Recrystallization of the resulting solid from benzene-n-hexane gave the above titled product. Yield 2.1 g. $[\alpha]_D^{22} + 44°$ (c 1, acetone).

e. Production of 5'', 6-di-O-acetyl-tetra-N-ethoxycarbonyl-2'', 3''-O-cyclohexylidene-3'-O-tosylvistamycin.

5'',6-Di-O-acetyl-tetra-N-ethoxycarbonyl-2'',3''-O-cyclohexylidenevistamycin (3.8 g) prepared in the above procedure (d) was dissolved in 70 ml of pyridine and the solution, after addition of 3 g. of tosyl chloride, was allowed at 25°C overnight to effect the 3'-tosylation. The reaction mixture was subsequently processed in the same manner as in Example 1, (b) to give a solid of the above titled compound. Yield 1.2g. $[\alpha]_D -3°$ (C 1, chloroform).

Elemental analysis Found: C 52.15, H 6.72, N 5.11, S 2.85%. Calcd. for $C_{46}H_{68}N_4O_{22}S$: C 52.07, H 6.46, N 5.28, S 3.02%.

f. Production of 5'',6-di-O-acetyl-3'-deoxy-tetra-N-ethoxycarbonyl-2'',3''-O-cyclohexylidenevistamycin.

The 3'-O-tosylvistamycin derivative (153mg) produced in the above procedure (e) was dissolved in 2 ml of dimethylformamide and the solution, after addition of 1.1 g of sodium iodide, was heated at 95°C for 24 hours to effect the 3'-iodination. The reaction mixture was subsequently processed in the same manner as in Example 1, (c) to give the above titled product. Yield 58 mg. $[\alpha]_D + 6.5°$ (c 1 chloroform).

Found: C 52.29, H 7.13, N 6.33%. Calcd. for $C_{39}H_{62}N_4O_{19}$: C 52.58, H 7.01, N 6.29%.

g. Production of 3'-deoxyvistamycin.

The 3'-deoxy derivative (153 mg) produced in the above procedure (f) was treated in the same manner as in Example 1, (d) to effect the removal of the ethoxycarbonyl groups, acetyl groups and the cyclohexylidene group. 3'-Deoxyvistamycin was afforded in a yield of 23 mg. $[\alpha]_D + 31°$ (c 1, water). Further treatment of this product with a column of CM Sephadex C-25 gave the above titled product of melting point of 139°–144°C (decomp.). $[\alpha]_D^{25} + 41°$ (c 1, water).

EXAMPLE 8

Synthesis of 3'-deoxyvistamycin a. Preparation of tetra-N-benzyloxycarbonylvistamycin.

To a mixture of vistamycin sulfate (10 g) and anhydrous sodium carbonate (9 g) in 75% aqueous methanol (300 ml), benzyl chloroformate (15 g) was added, and the stirring was continued for 1 hour at room temperature. The reaction mixture was evaporated to dryness. The residue was extracted with hot acetone. Evaporation of the solution gave a solid, 15.3 g. mp. 115°–118°C.

Elemental analysis Found: C 58.29, H 5.80, N 5.37%. Calcd. for $C_{44}H_{58}N_4O_{18} \cdot H_2O$: C 58.33, H 5.99, N 5.55%.

b. Preparation of tetra-N-benzyloxycarbonyl-3'4'; 2'',3''-di-O-isopropylidenevistamycin.

To a solution of the solid product (3g) of the above procedure (a) and p-toluenesulfonic acid (100 mg) in dry dimethylformamide (40 ml), 2,2-dimethoxypropane $[(CH_3O)_2C(CH_3)_2]$ (4 ml) was added and the solution was heated at 50°C for 1 hour, followed by evaporation of the resulting solution to approximately 2/3 of the original volume. Another 2,2-dimethoxypropane was added and the solution was treated as above. After evaporation of the solvent, the residue was chromatographed on a column of silica gel with chloroformethyl acetate (3:2) containing 0.5% triethylamine. Such fractions of the eluate containing the above titled compound was evaporated to give a solid. Yield 1.1 g. $[\alpha]_D^{20} + 21°$ (c 1, chloroform).

Elemental analysis Found: C 61.57, H 6.00, N 5.51%. Calcd. for $C_{55}H_{66}N_4O_{18}$: C 61.67, H 6.21, N 5.23%.

c. Preparation of 6,5''-di-O-acetyl-tetra-N-benzyloxycarbonyl-3',4': 2'',3''-di-O-isopropylidenevistamycin.

The product of the above procedure (b) was acetylated with acetic anhydride in pyridine in a similar way to the procedure of Example 7, (c) to give the above titled compound substantially quantitatively. $[\alpha]_D^{20} + 24°$ (c 0.5, chloroform).

Elemental analysis Found: C 61.11, H 6.29, N 4.90%. Calcd. for $C_{59}H_{70}N_4O_{20}$: C 61.34, H 6.11, N 4.85%.

d. Preparation of 6,5''-di-O-acetyl-tetra-N-benzyloxycarbonyl-2'',3''-O-isopropylidenevistamycin [in the aforesaid formula (IIIe); $R_1=C_6H_5CH_2$, $Y=(CH_3)_2C<$, $Z'' = Z''' = CH_3CO$].

A solution of the product (320 mg) of the above procedure (c) in acetone-60% acetic acid (1:1, 10 ml) was heated at 50°C for 1 hour to effect the selective removal of the 3',4'-isopropylidene group. The solution was then admixed with a volume of toluene and the mixture was coevaporated with the toluene to give a solid, which was dissolved in chloroform. The solution was washed with aqueous sodium hydrogen carbonate solution and with water, dried over anhydrous sodium sulfate and evaporated to give a solid of the above titled compound. Yield 270 mg. $[\alpha]_D^{20} + 10°$ (c 1, chloroform).

Elemental analysis Found: C 60.73, H 5.73, N 5.14%. Calcd. for $C_{56}H_{66}N_4O_{20}$: C 60.31, H 5.97, N 5.02%.

e. Production of 6,5''-di-O-acetyl-tetra-N-benzyloxycarbonyl-2'',3''-O-isopropylidene-3'-O-mesylvistamycin.

To a solution of the product (300 mg) of the above procedure (d) in pyridine (5 ml), mesyl chloride (40 mg) was added and the solution was allowed to stand at room temperature overnight. The solution was evaporated and the residue was dissolved in chloroform. The solution was washed with water, dried over anhydrous sodium sulfate and evaporated to give a solid, which was reprecipitated from benzene-n-hexane several times to give a solid of the above titled product. Yield 120 mg. $[\alpha]_D^{20} -5°$, (c 1, chloroform).

Elemental analysis Found: C 57.42, H 5.88, N 4.76, S 2.74%. Calcd. for $C_{57}H_{68}N_4O_{22}S$: C 57.37, H 5.74, N 4.70, S 2.69%.

f. Production of 6,5''-di-O-acetyl-tetra-N-benzyloxycarbonyl-3'-deoxy-2'',3''-O-isopropylidenevistamycin.

The product of the above procedure (e) was processed in the same manner as in Example 7, (f) by reaction with sodium iodide followed by hydrogenation. The above titled compound was obtained. $[\alpha]_D^{20} + 8°$ (c 1, chloroform), Elemental analysis Found: C 61.33, H 6.21, N 5.08% Calcd. for $C_{56}H_{66}N_4O_{19}$: C 61.19, H 6.05, N 5.10% g. Production of 3'-deoxyvistamycin.

The product (150 mg) of the above procedure (f) was dissolved in methanol (2 ml) containing 10% ammonium hydroxide and the solution was allowed to stand at room temperature overnight to remove the acetyl groups. The solution was then evaporated and the residue was successively treated with hydrogen in aqueous dioxane in the presence of palladium black to remove the benzyloxycarbonyl groups by hydrogenolysis and with 1N hydrochoric acid to remove the isopropylidene group by hydrolysis. The deblocked product so formed was then purified by chromatographying in a column of CM-Sephadex C-25 ($NH_4^+$ form) with aqueous ammonia with linear increases in the ammonia concentration (0.0N to 0.3N). Fractions of the eluate containing the desired product were evaporated to give 3'-deoxyribostamycin as a colorless powder. mp. 134°–144°C (decomp.), $[\alpha]_D^{25} + 41°$ (c 1, water). NMR (in $D_2O$ at 100 M Hz): $\tau$ 8.83 (1H quartet, J 13 Hz, $H-2_{ax}$), 8.40 (1H quartet. J 12 Hz, $H-3'_{ax}$), 8.2-7.9 (2H multiplet, $H-2_{eq}$ and $H-3'_{eq}$).

Elemental analysis Found: C 43.59, H 8.07, N 11.75%. Calcd. for $C_{17}H_{34}N_4O_9 \cdot 2H_2O$: C 43.03, H 8.07, N 11.80%.

EXAMPLE 9

Synthesis of 3'-deoxy-6'-N-methylkanamycin B

3'-Deoxykanamycin B (100 mg) synthetized in Example 1 was dissolved in 5 ml. of a mixture of water-dioxane (1:2) and the solution, after addition of 62 mg of benzyl p-nitrophenyl carbonate ($C_6H_5CH_2OCOOC_6H_4NO_2$), was stirred at 0°C for 5 hours to effect the N-benzyloxycarbonylation. The reaction mixture was concentrated to dryness and the resulting solid was extracted with water. The aqueous extract was concentrated and the concentrated solution was chromatographed in a column of a cation-exchange resin copolymer of methacrylic acid and divinylbenzene containing functional carboxylic groups (commercially available under a trade name "Amberlite" IRC 50, a product of Rohm & Haas Co., U.S.A.) with aqueous ammonia with linear increases in the ammonia concentration (ON to 0.05N). Active fractions of the eluate were collected together and concentrated to dryness to give a solid which mainly comprised 6'-N-benzyloxycarbonyl-3'-deoxykanamycin B. Yield 32 mg. This solid was suspended in tetrahydrofuran and the suspension, after addition of 20 mg of lithium aluminum hydride, was refluxed for 20 hours. The reaction mixture was poured into water and the precipitate deposited was removed by filtration. The aqueous filtrate was concentrated and then admixed with anisaldehyde to give a precipitate which mainly comprised of penta-N-anisylidene-6'-N-benzyloxycarbonyl-3'-deoxykanamycin B. This precipitate was removed, washed with petroleum ether and then dissolved in chloroform. The resulting solution was washed with water and then admixed with 0.2N hydrochloric acid, so that the desired product was transferred into the aqueous phase. The aqueous solution was concentrated and the concentrated solution was chromatographed on a column of a strongly basic anion-exchange resin of a polystyrene containing quaternary ammonium groups -N-($CH_3$)$_3$OH as the functional groups thereof (commercially available under a registered trade name Amberlite IRA 900, a product of Rohm & Haas Co., U.S.A.) by developing with water. Fractions of the eluate containing the desired compound were collected together and concentrated to dryness. The solid was then purified by chromatographing in a column of CM-Sephadex C-25 with aqueous ammonia with gradually increasing the ammonia concentration from 0.02N to 0.1N. The desired compound 3'-deoxy-6'-N-methylkanamycin B was obtained in a yield of 5.6 mg. $[\alpha]_D$ + 122° (c 1, water).

Elemental analysis Found: C 45.48, H 8.19, N 14.31% Calcd. for $C_{19}H_{39}N_5O_9 \cdot H_2O$: C 45.67, H 8.27, N 14.02%

EXAMPLE 10

Synthesis of 3'-deoxy-6'-N-methylneamine

3'-Deoxyneamine synthetized in Example 5 was further processed in the same manner as in Example 9, and 3'-deoxy-6'-N-methylneamine was afforded. Yield 35%. $[\alpha]_D^{20}$ + 87° (c 1, water).

Elemental analysis Found: C 46.43, H 9.03, N 16.48%. Calcd. for $C_{13}H_{28}N_4O_5 \cdot H_2O$: C 46.13, H 8.94, N 16.56%.

EXAMPLE 11

Synthesis of 3'-deoxy-6'-N-methylvistamycin

3'-Deoxyvistamycin synthetized in Example 7 was further processed in the same manner as in Example 9, and 3'-deoxy-6'-N-methylvistamycin was afforded. Yield 48%. $[\alpha]_D^{20}$ + 35° (c 1, water).

Elemental analysis Found: C 44.46, H 8.09, N 11.50%. Calcd. for $C_{18}H_{36}N_4O_9 \cdot 2H_2O$: C 44.25, H 8.25, N 11.47%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages conditions.

What we claim is:

1. A process for the production of a 3'-deoxy derivative of an aminoglycosidic antibiotic of the formula:

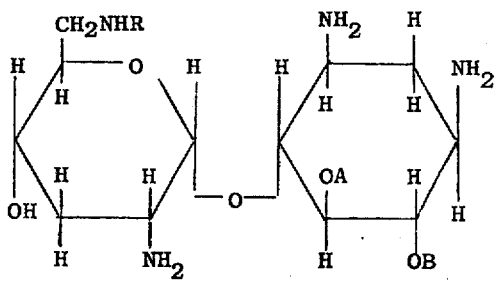

wherein R is hydrogen or alkyl of 1–4 carbon atoms; A is hydrogen or β-D-ribofuranosyl: B is hydrogen or 3-amino-3-deoxy-α-D-glucopyranosyl, provided that A is not β-D-ribofuranosyl when B is 3-amino-3-deoxy-α-D-glucopyranosyl, which comprises a. preferentially 3' sulfonating an amino-protected and hydroxyl-protected aminoglycoside selected from the group consisting of compounds of the formulae (i) through (vi):

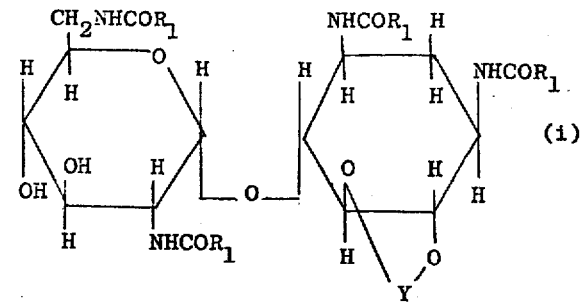

(i)

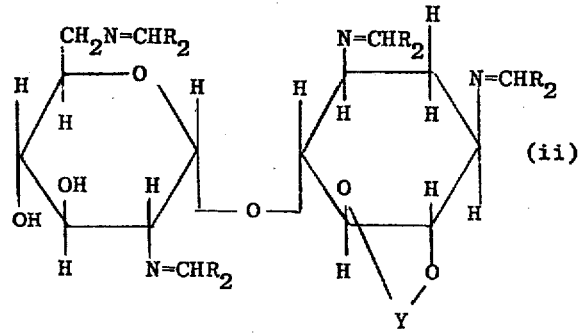

(ii)

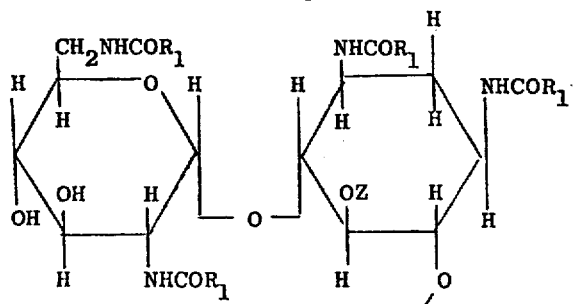

(iii)

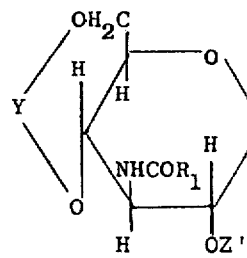

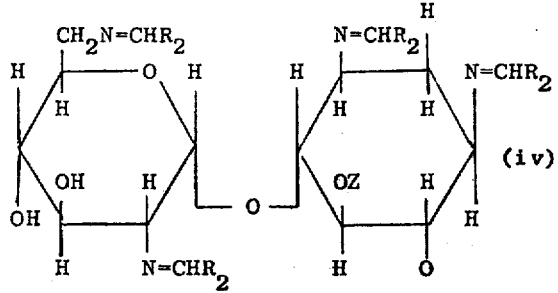

(iv)

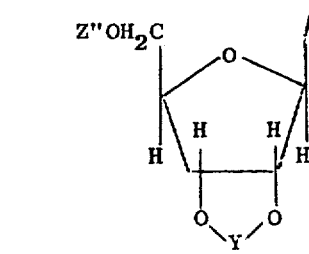

(v)

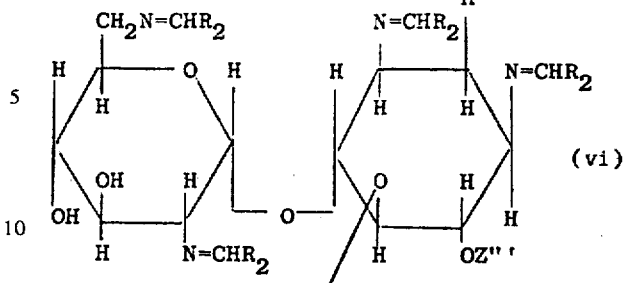

(vi)

wherein:
$R_1$ is hydrogen, alkyl of 1–6 carbon atoms, alkoxy of 1–6 carbon atoms, phenyl, phenoxy, benzyloxy or p-nitrobenzyloxy;

$R_2$ is hydrogen, alkyl of 1–6 carbon atoms, phenyl, p-methoxylphenyl or o-hydroxyphenyl;

Y is cyclohexylidene, tetrahydropyranyl of the formula

 or a group of the formula

wherein:
P and P' are each hydrogen, alkyl of 1–4 carbon atoms, phenyl, p-methoxylphenyl or o-hydroxyphenyl;

Z is hydrogen, alkanoyl of 2–5 carbons, hemiacetal or hemiketal;

Z' is hydrogen, alkanoyl of 2–5 carbon atoms, benzyl, alkylsulfonyl of 1–4 carbon atoms, benzylsulfonyl, phenylsulfonyl or p-tolylsulfonyl; and Z'' and Z''' are each alkanoyl of 2-5 carbon atoms, benzoyl or benzyl, by reacting said protected aminoglycoside with up to 1.5 moles of a sulfonylating agent of the formula $R_3SO_3X$ or $(R_3SO_2)O$ wherein $R_3$ is alkyl of 1-4 carbon atoms, benzyl, phenyl or p-tolyl and X is halogen, in a basic solvent at a temperature of up to 100° C. for a period of time sufficient to preferentially sulfonylate the 3'-hydroxyl group of said protected aminoglycoside;

b. removing the 3'-sulfonic ester from the resultant product by 3'-iodination or 3'-bromination; and c. reducing the resultant 3'-iodinated or 3'-brominated product to form the corresponding 3'-deoxy derivative of said aminoglycoside.

2. A process according to claim 1 wherein said sulfonylating agent is one in which $R_3$ is alkyl of 1-4 carbon atoms and X is bromide or iodide, wherein the reaction a) is effected with up to 1.5 moles of sulfonylating agent per mole of said protected aminoglycoside at a temperature of up to 50° C.

3. A process according to claim 1, wherein said sulfonylating agent is one in which $R_3$ is benzyl, phenyl or p-tolyl and X is bromide or iodide, wherein the reaction a) is effected with at least an equimolar amount of said sulfonylating agent.

4. A process according to claim 1 wherein said 3' sulfonic ester is removed in step (b) by 3'-iodination or 3'-bromination with a concentrated solution of alkali metal iodide or alkali metal bromide in an aprotic solvent.

5. A process according to claim 1 wherein said reduction step (c) is effected by catalytic hydrogeneration.

6. A process according to claim 1 further comprising removing said protective groups to form a free 3'-deoxy aminoglycoside wherein R is hydrogen.

7. A process according to claim 6 further comprising 6'-N-alkylating the resultant free 3'-deoxy amidoglycoside to form a 3'-deoxy compound wherein R is alkyl of 1-4 carbon atoms.

8. A process according to claim 6 further comprising (a) 6'-N-methylating said 3'-deoxy compound with a 6'-N-carboxylating agent selected from the group consisting of benzyloxycarboxyl chloride, benzyl p-nitrophenyl carbonate and N-(benzyloxycarboxyloxy)-succinimide to form a corresponding 6'-N-benzyloxycarboxyl-3'-deoxy compound; and (b) reducing the resultant 6'-N-benzyloxycarboxylation product with lithium aluminum hydride or diborane to form said 6'-N-methyl-3'-deoxy compound.

9. A process according to claim 6 wherein said protected aminoglycoside is a compound of formula iii or iv as defined therein, whereby the resultant 3-deoxy compound is 3'-deoxykanamycin β.

10. A 3'-deoxy kanamycin B derivative of the formula:

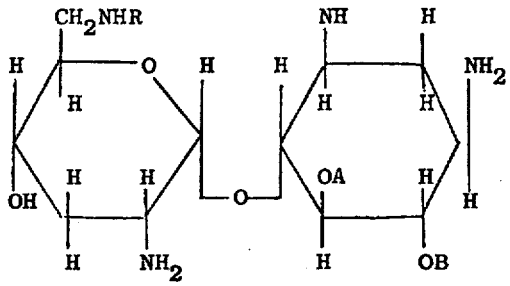

wherein R is alkyl of 1-4 carbon atoms; A is hydrogen; and B is 3-amino-3-deoxy-α-D-glucopyranosyl, and the pharmaceutically acceptable acid addition salts thereof.

11. A compound according to claim 10, 3'-deoxykanamycin B.

12. A compound according to claim 10, 3'-deoxy-6'-N-methylkanamycin B.

13. A 3'-deoxyvistamycin derivative of the formula:

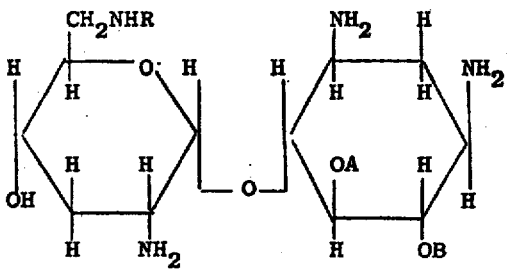

wherein R is hydrogen or alkyl of 1-4 carbon atoms; A is β-D-ribofuranosyl; and B is hydrogen, and the pharmaceutically acceptable acid addition salts thereof.

14. A compound according to claim 13, 3'-deoxyvistamycin.

15. A compound according to claim 13, 3'-deoxy-6'-N-methylvistamycin.

16. A 3'-deoxy-6'-N-alkylneamine of the formula:

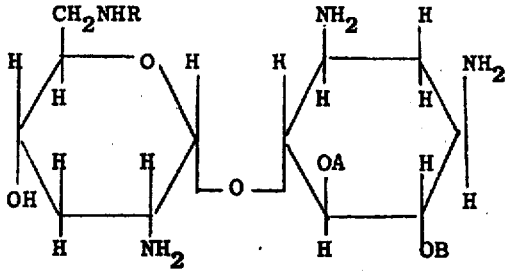

wherein R is alkyl of 1-4 carbon atoms; A is hydrogen; and B is hydrogen, and the pharmaceutically acceptable acid addition salts thereof.

17. A compound according to claim 16, 3'-deoxy-6'-N-methylneamine.

* * * * *